(12) United States Patent
Plotkowski et al.

(10) Patent No.: US 10,760,148 B2
(45) Date of Patent: Sep. 1, 2020

(54) ADDITIVE MANUFACTURING METHODS USING ALUMINUM-RARE EARTH ALLOYS AND PRODUCTS MADE USING SUCH METHODS

(71) Applicants: UT-Battelle, LLC, Oak Ridge, TN (US); University of Tennessee Research Foundation, Knoxville, TN (US); Iowa State University Research Foundation, Inc., Ames, IA (US); Eck Industries Incorporated, Manitowoc, WI (US)

(72) Inventors: Alex J. Plotkowski, Oak Ridge, TN (US); Orlando Rios, Oak Ridge, TN (US); Sudarsanam Suresh Babu, Oak Ridge, TN (US); Ryan R. Dehoff, Knoxville, TN (US); Ryan Ott, Ames, IA (US); Zachary C. Sims, Knoxville, TN (US); Niyanth Sridharan, Oak Ridge, TN (US); David Weiss, Manitowoc, WI (US); Hunter B. Henderson, Knoxville, TN (US)

(73) Assignees: UT-Battelle, LLC, Oak Ridge, TN (US); University of Tennessee Research Foundation, Knoxville, TN (US); Iowa State University Research Foundation, Inc., Ames, IA (US); Eck Industries Incorporated, Manitowoc, WI (US)

( * ) Notice: Subject to any disclaimer, the term of this patent is extended or adjusted under 35 U.S.C. 154(b) by 235 days.

(21) Appl. No.: 15/650,664

(22) Filed: Jul. 14, 2017

(65) Prior Publication Data

US 2018/0080103 A1 Mar. 22, 2018

Related U.S. Application Data

(60) Provisional application No. 62/396,490, filed on Sep. 19, 2016, provisional application No. 62/396,485, filed on Sep. 19, 2016.

(51) Int. Cl.
*C22C 21/00* (2006.01)
*C22F 1/04* (2006.01)
(Continued)

(52) U.S. Cl.
CPC .......... *C22C 23/06* (2013.01); *B22D 21/007* (2013.01); *B22F 3/1055* (2013.01);
(Continued)

(58) Field of Classification Search
CPC ....... C22C 23/06; C22C 1/0416; C22C 30/06; C22C 21/00; C22C 28/00; C22C 1/03;
(Continued)

(56) References Cited

U.S. PATENT DOCUMENTS 3,252,841 A * 5/1966 Foerster .................. C22C 21/02
148/401
4,915,869 A 4/1990 Aubert et al.
(Continued)

FOREIGN PATENT DOCUMENTS

DE 10 2011 111365 2/2013
DE 102011111365 A1 * 2/2013 ............... B22F 1/02
(Continued)

OTHER PUBLICATIONS

A. Plotkowski et al., Evaluation of an Al—Ce alloy for laser additive manufacturing, Acta Materialia 126 (2017) pp. 507-519 (Year: 2017).*
(Continued)

*Primary Examiner* — Jessee R Roe
*Assistant Examiner* — Rebecca Janssen
(74) *Attorney, Agent, or Firm* — Klarquist Sparkman, LLP

(57) ABSTRACT

Described herein are additive manufacturing methods and products made using such methods. The alloy compositions described herein are specifically selected for the additive (Continued)

manufacturing methods and provide products that exhibit superior mechanical properties as compared to their cast counterparts. Using the compositions and methods described herein, products that do not exhibit substantial coarsening, such as at elevated temperatures, can be obtained. The products further exhibit uniform microstructures along the print axis, thus contributing to improved strength and performance. Additives also can be used in the alloys described herein.

17 Claims, 32 Drawing Sheets

(51) Int. Cl.

| | |
|---|---|
| B22F 3/105 | (2006.01) |
| C22C 1/04 | (2006.01) |
| B33Y 10/00 | (2015.01) |
| B33Y 80/00 | (2015.01) |
| C22C 23/06 | (2006.01) |
| C22C 21/08 | (2006.01) |
| C22C 21/06 | (2006.01) |
| C21D 1/10 | (2006.01) |
| B23K 26/354 | (2014.01) |
| B22D 21/00 | (2006.01) |
| C22C 1/03 | (2006.01) |
| C22C 28/00 | (2006.01) |
| C22C 30/06 | (2006.01) |

(52) U.S. Cl.
CPC .......... *B23K 26/354* (2015.10); *B33Y 10/00* (2014.12); *B33Y 80/00* (2014.12); *C21D 1/10* (2013.01); *C22C 1/03* (2013.01); *C22C 1/0416* (2013.01); *C22C 21/00* (2013.01); *C22C 21/06* (2013.01); *C22C 21/08* (2013.01); *C22C 28/00* (2013.01); *C22C 30/06* (2013.01); *C22F 1/04* (2013.01); *Y02P 10/253* (2015.11)

(58) Field of Classification Search
CPC . B22F 3/1055; C22F 1/04; C21D 1/10; B23K 26/354; B22D 21/007; B33Y 80/00; B33Y 10/00; Y02P 10/253
See application file for complete search history.

(56) References Cited

U.S. PATENT DOCUMENTS

| | | | |
|---|---|---|---|
| 5,037,608 A | | 8/1991 | Tarcy et al. |
| 5,431,751 A | * | 7/1995 | Okochi ................. C22C 21/00 148/403 |
| 5,578,144 A | * | 11/1996 | Satou .................... C22C 21/00 148/415 |
| 2003/0183306 A1 | | 10/2003 | Hehmann et al. |
| 2004/0238150 A1 | | 12/2004 | Adachi et al. |
| 2010/0282428 A1 | * | 11/2010 | Pandey ................. C22C 21/00 164/46 |
| 2012/0152414 A1 | | 6/2012 | Che et al. |
| 2014/0326368 A1 | | 11/2014 | Okamoto |
| 2016/0053346 A1 | | 2/2016 | Szuromi et al. |
| 2017/0096730 A1 | * | 4/2017 | Rios ...................... B22D 7/005 |

FOREIGN PATENT DOCUMENTS

| | | |
|---|---|---|
| JP | H07 268597 | 10/1995 |
| JP | 3392509 | 3/2003 |

OTHER PUBLICATIONS

A. Plotkowski et al., Corrigendum to Evaluation of an Al—Ce alloy for laser additive manufacturing, Acta Materialia 159 (2018) pp. 439-441. (Year: 2018).*
Graham et al., Coarsening of Eutectic Microstructures at Elevated Temperatures, transactions of the Metallurgical Society of AIME, vol. 236, pp. 94-102 (1966) (Year: 1996).*
Abbas, "Effect of high power diode laser surface melting on wear resistance of magnesium alloys," *Wear*, vol. 260, pp. 175-180, May 10, 2005.
Jun et al., "Characterization and wear resistance of laser surface melting AZ91 D alloy," *Journal of Alloys and Compounds*, vol. 455, pp. 142-147, Jan. 16, 2007.
Sims et al., "Cerium-Based, Intermetallic-Strengthened Aluminum Casting Alloy: High-Volume Co-product Development," *JOM*, 68(7): 1940-1947, May 23, 2016.
Sims et al., "Characterization of Near Net-Shape Castable Rare Earth Modified Aluminum Alloys for High Temperature Application," *Light Metals*, ed. Edward Williams, pp. 111-114, 2016.
Tomida et al., "Improvement in wear resistance of hyper-eutectic Al—Si cast alloy by laser surface remelting," *Surface and Coatings Technology*, vol. 169-170, pp. 468-471, 2003.
Trevisan, "On the Selective Laser Melting (SLM) of the AlSi10Mg Alloy: Process, Microstructure, and Mechanical Properties," *Materials*, 10(1): 37 pages, Jan. 2017.
Yilmaz et al., "The microstructure and mechanical properties of unidirectionally solidified Al—Si alloys," *Journal of Materials Science*, vol. 24, pp. 2065-2070, 1989.
Zhang et al., "Effect of substituting cerium-rich mischmetal with lanthanum on mictrostructure and mechanical properties of die-cast Mg—Al—Re alloys," *Materials and Design*, vol. 30, pp. 23-72-2378, Nov. 7, 2008.
International Search Report and Written Opinion issued for International Application No. PCT/US2016/41293 dated Nov. 17, 2016.
Audebert et al., "Production of glassy metallic layers by laser surface treatment," *Scripta Materialia*, 48(3): 281-286, Feb. 2003.
Chen et al., "Mechanical Properties of Nanometric Al2O3 Particulate-Reinforced Al—Al11Ce3 Composites Produced by Friction Stir Processing," *Materials Transcations*, 51(5): 933-938, Apr. 7, 2010.
International Search Report and Written Opinion issued for International Application No. PCT/US2017/042208 dated Oct. 20, 2017.
International Search Report and Written Opinion issued for International Application No. PCT/US2017/042203 dated Oct. 20, 2017.

\* cited by examiner

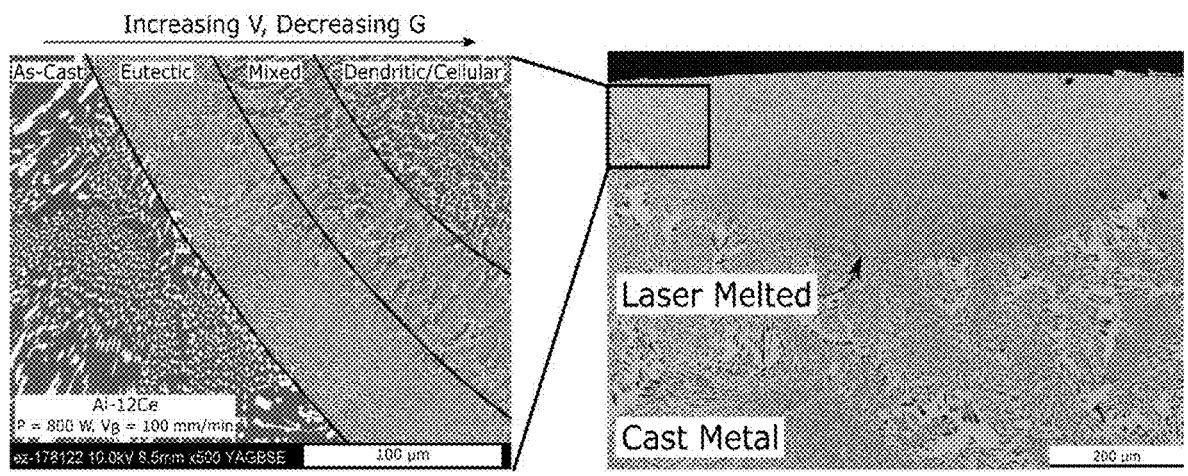
FIG. 23A  FIG. 23B
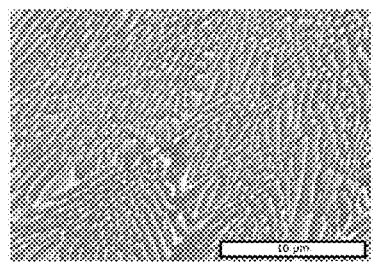 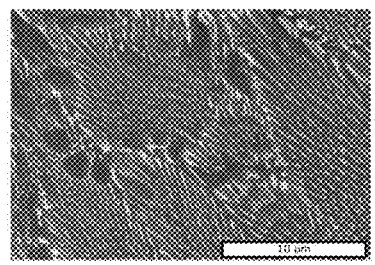 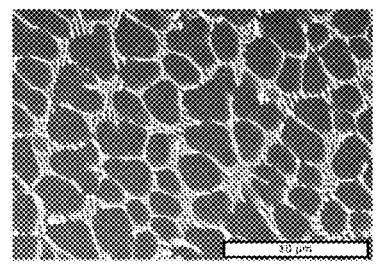
FIG. 24A  FIG. 24B  FIG. 24C
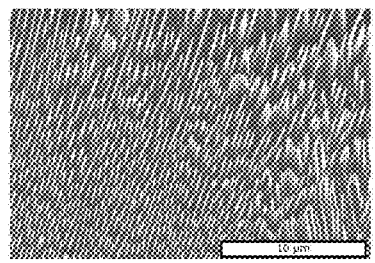 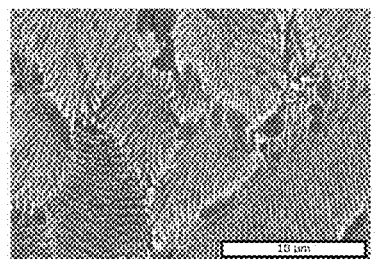 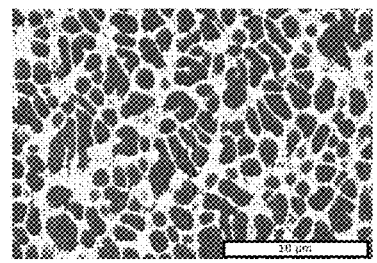
FIG. 24D  FIG. 24E  FIG. 24F
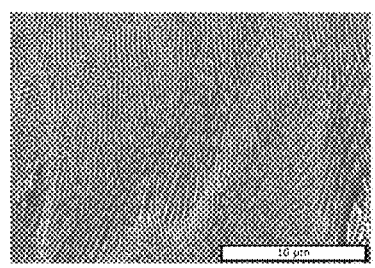 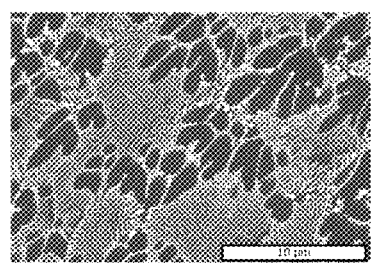 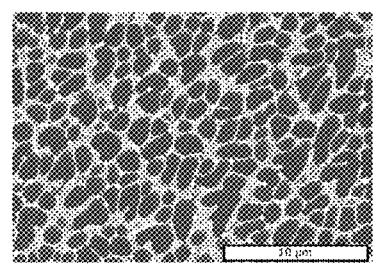
FIG. 24G  FIG. 24H  FIG. 24I

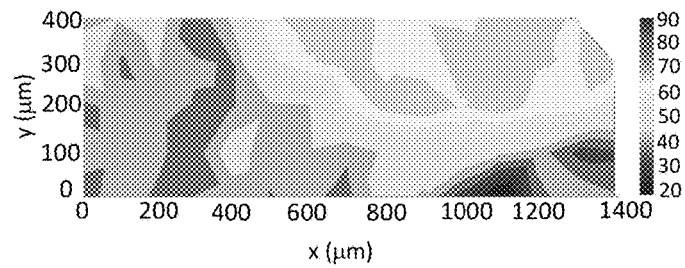
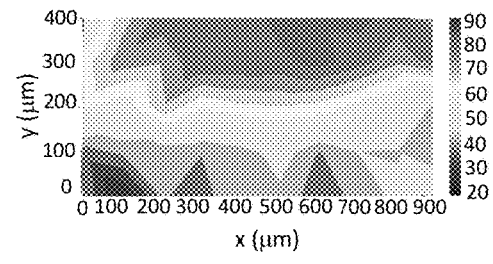
FIG. 27A    FIG. 27B
FIG. 28A    FIG. 28B
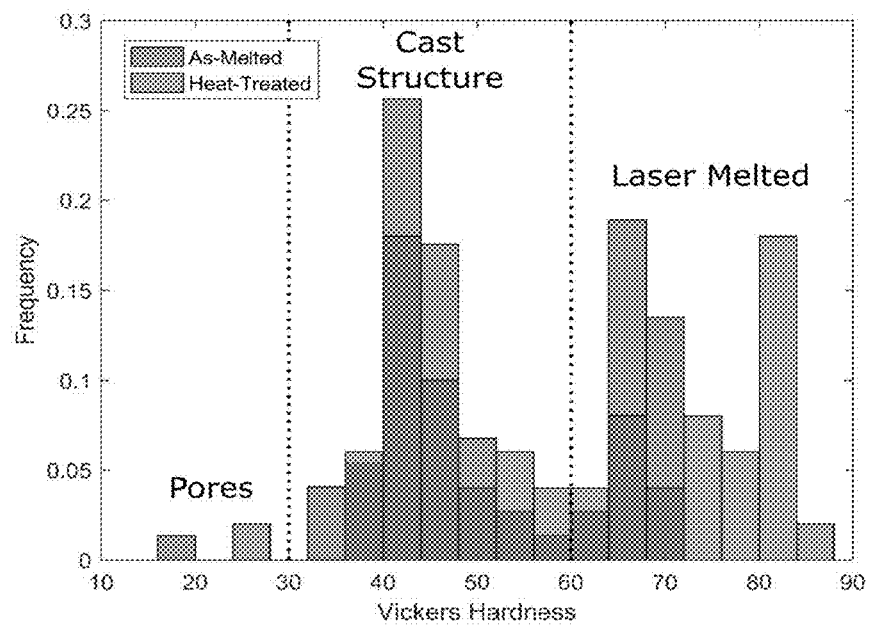
FIG. 29

ADDITIVE MANUFACTURING METHODS USING ALUMINUM-RARE EARTH ALLOYS AND PRODUCTS MADE USING SUCH METHODS

CROSS REFERENCE TO RELATED APPLICATION

This application claims the benefit of the earlier filing date of U.S. Provisional Patent Application No. 62/396,490, filed on Sep. 19, 2016, and U.S. Provisional Patent Application No. 62/396,485, filed on Sep. 19, 2016; the entirety of each of these prior applications is incorporated herein by reference.

ACKNOWLEDGMENT OF GOVERNMENT SUPPORT

This invention was made with government support under Contract Nos. DE-AC05-00OR22725 and DE-AC02-07CH11358 awarded by the United States Department of Energy. The government has certain rights in the invention.

FIELD

The present disclosure concerns embodiments of an additive manufacturing method using aluminum-rare earth alloys and product embodiments made using such methods.

PARTIES TO JOINT RESEARCH AGREEMENT

The invention arose under an agreement between UT-Battelle, LLC, University of Tennessee Research Foundation, Iowa State University of Science and Technology, and Eck Industries, Inc., funded by the Critical Materials Institute of the United States Department of Energy, which agreement was in effect on or before the effective filing date of the claimed invention.

BACKGROUND

Aluminum alloys are useful for weight-critical applications, but are presently limited to applications below 230° C. due to rapid fall-off or degradation in mechanical characteristics as temperature increases. There is a need in the art for aluminum alloy compositions that can be used for additive manufacturing methods so that aluminum-based components that are useful for high-temperature applications without undesirable changes in mechanical characteristics can be produced.

SUMMARY

Disclosed herein are embodiments of an alloy product, such as an alloy product formed using an additive manufacturing process. The alloy products described herein have unique and superior properties compared to products made using additive manufacturing methods in combination with conventional alloys. The alloy products can comprise two or more shaped alloy layers formed about a print axis, wherein at least one of the shaped alloy layers includes an alloy comprising 4 wt % to 60 wt % Sc, Y, La, Ce, Pr, Nd, Sm, Eu, Gd, Tb, Dy, Ho, Er, Tm, Yb, or a combination thereof; 0 wt % to 15 wt % Mg; 0 wt % to 12 wt % Si; 0 wt % to 6 wt % Fe; 0 wt % to 5 wt % Ni; 0 wt % to 6 wt % Zn; and aluminum. In particular disclosed embodiments, the shaped alloy layers do not exhibit substantial coarsening during additive manufacturing processes described herein and/or during post-manufacturing uses of the products comprising such shaped alloy layers. In some embodiments, 5% to 60% by volume of the alloy product comprises an intermetallic compound comprising any combination of elements listed above.

Also described herein are embodiments of an additive manufacturing method for making a product, comprising: a) forming a first layer with a first composition comprising aluminum and at least one additional alloying metal used to form an alloy with the aluminum; b) forming a first shaped alloy layer from the first composition by exposing all or a portion of the first layer to an energy source; c) forming a second layer on the first shaped alloy layer with a second composition comprising aluminum and at least one additional alloying metal; d) forming a second shaped alloy layer from the second composition by exposing all or a portion of the second layer to an energy source, thereby forming a second shaped alloy layer adjacent to the first shaped alloy layer; and wherein the at least one additional alloying metal of at least one of the first or second compositions has a maximum solid solubility of ≤0.5 wt % in aluminum.

In some embodiments, steps of the additive manufacturing method can be repeated to add multiple additional shaped alloy layers stacked on the second shaped alloy layer. In yet additional embodiments, the first shaped alloy layer is formed adjacent to one or more additional additively manufactured shaped alloy layers. In some embodiments, each shaped alloy layer formed during the additive manufacturing method exhibits a microstructure along a print axis defined during the additive manufacturing method, the microstructure being uniform or substantially uniform with a microstructure of other shaped alloy layers formed during the additive manufacturing method. In particular disclosed embodiments, the AM method embodiments disclosed herein produce products comprising a microstructure that is uniform or substantially uniform throughout a print axis defined during the method.

In some embodiments, an intermetallic phase of the at least one additional alloying metal does not exhibit significant structural changes in average thickness of morphological features, average number density of features, average spacing of morphological features, or a combination thereof, during a post-additive heat treatment process as determined by comparing an SEM and/or optical micrograph of the product prior to the post-additive process with an SEM and/or optical micrograph of the product after the heated post-additive process. In some embodiments, no more than 0.5% of the at least one additional alloying metal is present as a solute in the aluminum matrix. The feedstock used to form the first and/or second compositions in the disclosed method embodiments can be a powder feedstock or a wire feedstock. The energy source used in the disclosed method embodiments can include, but is not limited to, a laser or electron beam device, or an induction device. In some embodiments using laser and/or electron beam devices, the method can further comprise changing a power, spot size, accelerating voltage, and/or velocity of the laser or electron beam device to thereby obtain a selected microstructure of a shaped alloy layer at a specified location within the shaped alloy layer. In embodiments wherein the energy source is an induction device, the method can further comprise the application of local electric currents to melt and form a shaped alloy layer formed with the additive manufacturing method. In some embodiments, the at least one additional alloying metal is selected from Sc, Y, La, Ce, Pr, Nd, Sm, Eu, Gd, Tb, Dy, Ho, Er, Tm, Yb, or a combination thereof and at least one of the first or second compositions comprises a total of 4 wt % to 60 wt % of the at least one additional alloying metal. In some embodiments, one or more additive alloying components can be used in the first and/or second compositions.

The foregoing and other objects, features, and advantages of the present disclosure will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 2A illustrates results obtained from a laser velocity of 100 mm/min; FIG. 2B illustrates results obtained from a laser velocity of 200 mm/min; FIG. 2C illustrates results obtained from a laser velocity of 300 mm/min; the laser power used as 800 W and the spot size used was 1.5 mm.

FIG. 3A illustrates results obtained from a laser velocity of 100 mm/min; FIG. 3B illustrates results obtained from a laser velocity of 200 mm/min; FIG. 3C illustrates results obtained from a laser velocity of 300 mm/min.

(FIG. 20A) and interface growth temperatures for an Al-12Ce alloy with a thermal gradient of $10^6$ K/m (FIG. 20B).

FIGS. 23A and 23B are SEM micrographs showing the comparison of as-cast and laser weld microstructural length scales for a beam velocity of 100 mm/min (FIG. 23B); FIG. 23A is an zoomed image of FIG. 23B.

FIGS. 24A-24I are high magnification views of differences in microstructure at different points in the weld region for the three beam velocities utilized to obtain the images shown by FIGS. 2A-2C.

FIGS. 27A and 27B are SEM micrographs of a laser-melted Al-12Ce alloy component showing the locations of the hardness indents relative to the weld region in the upper right portion of the micrograph (FIG. 27A); FIG. 27B is a zoomed image of the illustrated region of FIG. 27A.

FIGS. 28A and 28B are color images of a Vickers hardness map of the laser-melted Al-12Ce alloy component of FIGS. 27A and 27B, showing the hardness differences between the cast microstructure and the subsequently laser-melted microstructure.

FIG. 29 illustrates histograms showing the distribution of Vickers hardness measurements for the as-melted and heat-treated conditions.

FIGS. 39A-39I are low-high magnification images of Al-8Ce-10Mg powder from 3 different regions of the number 5 pillar shown in FIG. 38, wherein FIGS. 39A-39C show images of increasing magnification taken from the low portion of the number 5 pillar in FIG. 38, FIGS. 39D-39F show images of increasing magnification taken from the middle portion of the number 5 pillar in FIG. 38, and FIGS. 39G-39I show images of increasing magnification taken from the lower portion of the number 5 pillar in FIG. 38.

FIGS. 40A-40C show increasing magnification of the as-printed portion and FIGS. 40D-40DF show increasing magnification of the same portion after annealing.

FIGS. 41A-41C show increasing magnification of the as-printed portion and FIGS. 41D-41F show increasing magnification of the same portion after annealing.

FIGS. 42A-42C show increasing magnification of the as-printed portion and FIGS. 42D-42F show increasing magnification of the same portion after annealing.

DETAILED DESCRIPTION

I. OVERVIEW OF TERMS

Figure 1:
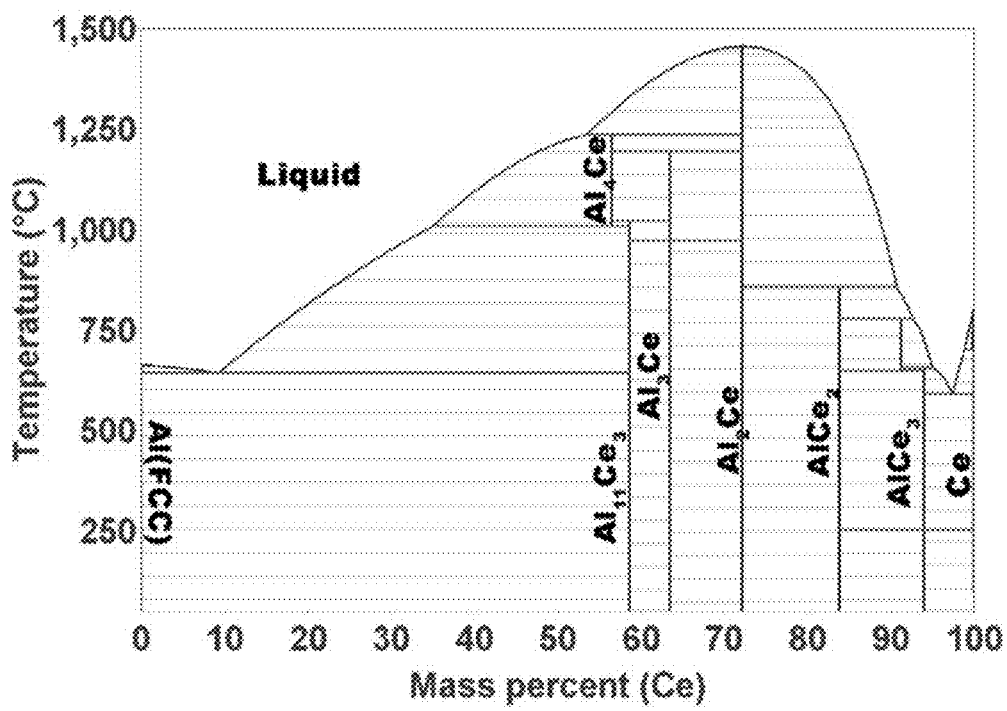
FIG. 1 is a binary Al—Ce alloy phase diagram calculated using computational thermodynamics.
Figures 2A, 2B, 2C:
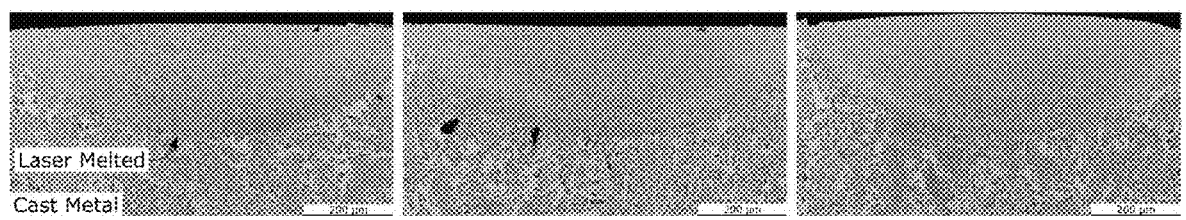
FIGS. 2A-2C are optical micrographs of weld cross-sections formed using different laser beam velocities.

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and compounds similar or equivalent to those described herein can be used in the practice or testing of the present disclosure, suitable methods and compounds are described below. The compounds, methods, and examples are illustrative only and not intended to be limiting, unless otherwise indicated. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under standard test conditions/methods. When directly and explicitly distinguishing embodiments from discussed prior art, the embodiment numbers are not approximates unless the word "about" is recited. Furthermore, not all alternatives recited herein are equivalents.

In some embodiments, reference is made herein to microstructures and/or products that do not exhibit "substantial coarsening" when being formed during an AM method and/or after exposure to a post-additive process. That is, the microstructures and/or products are able to resist coarsening during such processes. In some embodiments, a lack of "substantial coarsening" means that the morphological features of shaped alloy layers and/or additively manufactured products are resistant to coarsening such that (for example) the average thickness of the morphological features, the average number density of features, the average spacing (e.g., eutectic interlamellar spacing) of the morphological features, or a combination thereof may increase by less than 100%, less than 50%, less than 20%, less than 15%, less than 10%, or less than 5% after subjecting the shape alloy layer or a product to a temperature of 300° C. for 24 hours. In independent embodiments, the average cross section of the morphological features may increase by less than 50% after subjecting the shaped alloy layer or a product as described herein to a temperature of 300° C. for 24 hours. In some additional embodiments, a shaped alloy layer and/or a product (or microstructure thereof) disclosed herein lacks "substantial coarsening" after/during exposure to an environment at temperatures ranging from 150° C. to 500° C. for 24 hours and even up to 1500 hours. In yet some additional embodiments, coarsening is not substantial when coarsening of less than 50% (as evidenced by increased thickness, spacing, and/or cross-section of morphological feature), such as coarsening of less than 40%, less than 30%, or less than 20% occurs when the shaped alloy layer and/or product is exposed to a temperature of 300° C. for 1,000 hours. In yet some additional embodiments, lacking "substantial coarsening" means that an increase in average spacing of lamellae and/or particles does not occur over 24 hours at 300° C. Without wishing to be bound by a particular theory of operation, much of the resistance to coarsening can be attributed to low mobility of the rare-earth element in the aluminum matrix. A person of ordinary skill in the art, with the benefit of this disclosure, recognizes when a microstructure, shaped alloy layer, or product does not exhibit substantial coarsening as this can be evaluated using optical microscopy and/or SEM analysis. For example, a person of ordinary skill in the art can compare an SEM or optical micrograph of the inventive shaped alloy layers or products disclosed herein (and the microstructures thereof) with an SEM or optical micrograph of a shaped alloy layer or product comprising a conventional alloy, such as Al—Si and readily recognize that the inventive shaped alloy layers/products exhibit little to no coarsening (that is, it does not exhibit substantial coarsening), whereas the Al—Si-containing shaped alloy layer/product exhibits substantial coarsening.

The notation "Al-aX," as used in certain embodiments described herein, indicates the composition of the alloy, where "a" is the percent by weight of the rare earth component X in the Al-aX alloy. For example, Al-12Ce indicates an alloy of 12 wt % Ce with the balance being aluminum.

The following terms and definitions are provided:

Adjacent: When used in reference to the position of one or more layers (e.g., feedstock layers and/or shaped alloy layers), this term refers to a physical orientation (or ordering) of the reference layer and another layer wherein the reference layer and the other layer are physically associated through one or more intervening layers (e.g., one or more feedstock composition layers and/or shaped alloy layers).

Alloy: A solid or liquid mixture of two or more metals, or of one or more metals with certain metalloid elements, e.g., silicon.

Aluminum Matrix: The primary aluminum phase in the alloy, i.e., the alloy phase having aluminum atoms arranged in a face-centered cubic structure, optionally with other elements in solution in the aluminum structure.

Dendrite: A characteristic tree-like structure of crystals that grows as molten metal solidifies.

Eutectic Structure/Composition: A homogeneous solid mix of atomic and/or chemical species forming a super lattice having a unique molar ratio between the components. At this molar ratio, the mixtures melt as a whole at a specific temperature—the eutectic temperature. At other molar ratios, one component of the mixture will melt at a first temperature and the other component(s) will melt at a higher temperature.

Feedstock (or Feedstock Composition): In some embodiments, this term refers to the starting materials (e.g., individual metals or metal precursors) used to form a layer that is melted to form a shaped alloy layer in the AM methods described herein. In yet additional embodiments, this term can refer to a preformed alloy composition (wherein the individual alloy metals or metal precursors are pre-mixed)

used to form a layer that is melted to form a shaped alloy layer in the AM methods described herein.

Intermetallic phase: A solid-state compound containing two or more metallic elements and exhibiting metallic bonding, defined stoichiometry and/or ordered crystal structure, optionally with one or more non-metallic elements. In some instances, an alloy may include regions of a single metal and regions of an intermetallic phase. In a binary alloy comprising aluminum and a rare earth component X, where X is Ce, La, mischmetal, or a combination thereof, the intermetallic phase may have a formula $Al_{11}X_3$. Ternary and quaternary alloys may have other intermetallic phases such as, for example, AlCeSi.

Immediately Adjacent: When used in reference to the position of one or more layers (e.g., feedstock layers and/or shaped alloy layers), this term refers to a physical orientation (or ordering) of the reference layer and another layer wherein the reference layer and the other layer are in direct physical contact (e.g., the reference layer is positioned on top of, on the bottom of, or to the immediate left/right of the other layer).

Lamella: A thin layer or plate-like structure.

Low Solubility: A metal has low solubility in a second metal (e.g., aluminum) when it has a maximum solid solubility of ≤0.5 wt % in the second metal (e.g., aluminum). In particular disclosed embodiments, a metal has low solubility when it has maximum solid solubility of ≤0.1 wt % in aluminum.

Microstructure: The fine structure of an alloy (e.g., grains, cells, dendrites, rods, laths, lamellae, precipitates, etc.) that can be visualized and examined with a microscope at a magnification of at least 25×. Microstructure can also include nanostructure, i.e., structure that can be visualized and examined with more powerful tools, such as electron microscopy, atomic force microscopy, X-ray computed tomography, etc.

Mischmetal: An alloy of rare earth elements, typically comprising 47-70 wt % cerium and from 25-45 wt % lanthanum. Mischmetal may further include small amounts of neodymium, praseodymium, and/or trace amounts (i.e., less than 1 wt %) of other rare earth elements, and may include small amounts (i.e., up to a total of 15 wt %) of impurities such as Fe or Mg. In some examples, mischmetal comprises 47-70 wt % Ce, 25-40 wt % La, 0.1-7 wt % Pr, 0.1-17 wt % Nd, up to 0.5 wt % Fe, up to 0.2 wt % Si, up to 0.5 wt % Mg, up to 0.02 wt % S, and up to 0.01 wt % P. In certain examples, mischmetal comprises 50 wt % cerium, 25-30 wt % La, with the balance being other rare-earth metals. In one example, mischmetal comprises 50 wt % Ce, 25 wt % La, 15 wt % Nd, and 10 wt % other rare earth metals and/or iron. In an independent example, mischmetal comprises 50 wt % Ce, 25 wt % La, 7 wt % Pr, 3 wt % Nd, and 15 wt % Fe.

Molten: As used herein, a metal is "molten" when the metal has been converted to a liquid form by heating. In some embodiments, the entire amount of metal present may be converted to a liquid or only a portion of the amount of metal present may be converted to liquid (wherein a portion comprises greater than 0% and less than 100% [wt % or vol %] of the amount of metal, such as 90%, 85%, 80%, 70%, 60%, 50%, 40%, 30%, 20%, 10%, 5%, and the like.

Print Axis: An axis (or direction) along which shaped alloy layers are built, stacked, deposited, and/or shaped in an additive manufacturing method. In particular disclosed embodiments, the print axis can be defined by the direction in which individual shaped alloy layers are built during an additive manufacturing method, such as in a main direction parallel to the xz-plane, in a main direction parallel to the xy-plane, or in a direction parallel to the zx-plane (wherein x and y axes represent the building platform plane).

Rare earth component: As used herein, the term rare earth component refers to a component comprising one or more rare earth elements. As defined by IUPAC and as used herein, the term rare earth element includes the 15 lanthanide elements, scandium, and yttrium—Sc, Y, La, Ce, Pr, Nd, Sm, Eu, Gd, Tb, Dy, I, Er Tm, Yb, or Lu.

Semi-Eutectic Structure: A structure similar to a fully eutectic structure, but with deviations as a result of cooling rate. In some embodiments, a semi-eutectic structure takes the form of a dendritic/cellular-type structure, where a high solidification front velocity forms primary dendrites in a non-equilibrium fashion.

Shaped Alloy Layer: A layer formed during an additive manufacturing process, wherein a feedstock composition and/or layer formed with a feedstock composition making up the layer is melted using an energy source to form a consolidated pre-defined shape. Any particular shape is contemplated herein, but when the layer is "shaped," it is intended to be different from a layer comprising the feedstock composition used to prepare the shaped alloy layer.

Vickers hardness: A hardness measurement determined by indenting the test material with a pyramidal indenter, particular to Vickers hardness testing units, subjected to a load of 50 to 1000 gf for a period of time and measuring the resulting indent size. Vickers hardness may be expressed in units of HV. In particular disclosed embodiments, the Vickers hardness can be measured by ASTM method E384.

Weld (or melt) Region (or pool): As used herein, the terms "weld region" or "melt region" refer to a region melted (e.g., by exposure to a laser or induction melting) and re-solidified. The terms weld region, weld region, melt region, and melt pool are used interchangeably.

Yield strength or yield stress: The stress a material can withstand without permanent deformation; the stress at which a material begins to deform plastically.

II. INTRODUCTION

Additive manufacturing (also referred to herein as "AM"), particularly metal AM, presents many opportunities through its ability to manufacture components with complex geometries and site-specific manipulation of thermal conditions to control the microstructure. AM also presents unique challenges, such as the difficulty in producing dense parts from metal powders, controlling hot cracking, swelling and other defects, property anisotropy related to textural effects, and compositional changes due to preferred vaporization of volatile elements. The majority of research in metal AM has focused on process optimization for alloys that were originally designed for traditional manufacturing methods (e.g., casting). However, alloy selection in this manner will generally compromise on material properties in favor of minimizing defect development during processing.

While Ce is the most abundant of the rare earth metals, it is only considered a by-product of rare earth mining efforts due to a lack of high-volume applications. As a result, it is relatively inexpensive as an alloying element. In the phase diagram (FIG. 1) for the Al—Ce system, as determined using computational thermodynamics, a wide range of compositions between pure Al and the $Al_{11}Ce_3$ intermetallic are possible, featuring a eutectic point at Al-10Ce (all compositions given in weight percent) and 640° C. The small freezing range of near-eutectic compositions also display excellent fluidity and castability and can reduce hot-tearing.

Compared to as-cast near-eutectic Al—Si alloys modified by Sr, the as-cast Al-12Ce binary alloy demonstrated similar yield strength (57 MPa), ultimate tensile strength (161 MPa) and elongation (13.5%) values. A T6 heat treatment tended to decrease the UTS and yield strength by approximately 20%, but nearly doubled ductility to 26.5%. Additions of Si and Mg (Al-12Ce-4Si-0.4Mg) increased the yield strength (75 MPa), slightly decreased the as-cast UTS (141 MPa) and significantly decreased elongation (2%), but allowed for precipitation hardening that, upon T6 heat treatment, obtained a yield strength of 128.2 MPa, a UTS of 252.3 MPa, and improved the elongation to 8.5%, values which are competitive with commercial aluminum alloys such as A356. Due to their exceptional thermal stability, Al—Ce alloys shows promise for high temperature, weight-critical applications such as automotive engines. Al alloys currently used for such applications maintain only a small fraction (<25%) of their room temperature tensile properties after exposure to temperatures exceeding 300° C. The alloys described herein, however, are significantly more stable at similar elevated temperatures (and even higher temperatures), and further exhibit desirable casting characteristics, both of which lend to these compositions being excellent alloys for additive manufacturing.

The disclosed alloys provide flexibility in manipulating process parameters (e.g., beam power, beam velocity, spot size, part geometry, and the chosen scan strategy) such that microstructural features can be controlled through changes in the local thermal gradients (G) and solidification interface velocities (V). Additionally, the alloys described herein also make it possible control other aspects of alloy layer microstructure (and thus the overall microstructure of a product formed during an AM process), such as selecting particular microstructure phases, modifying phase or grain morphologies, and/or controlling precipitation behavior. To maintain these structures during processing however, the alloy should also resist coarsening during the thermal cycling that occurs as a result of melting neighboring material and subsequent layers. Conventional alloys are not able to resist such coarsening, particularly in view of the alloy components' mutual solubilities (e.g., magnesium and silicon exhibit high solubility in aluminum and as such alloys made with these components exhibit high levels of coarsening at the temperatures used in an AM process). As such, existing compositions originally designed for very different processing conditions typically are not suitable for additive manufacturing. Thus, a need exists in the art for alloys that are compatible with AM processing techniques and characteristics and that do not exhibit substantial coarsening during product formation and/or during post-AM processes utilizing the products.

Disclosed herein are compositions that are not only compatible with AM methods, but that also produce stable products with superior mechanical properties as compared to cast counterparts. The products described herein, which are formed using AM methods, also do not exhibit substantial coarsening during manufacturing and/or during post-manufacturing processes and further do not exhibit significant changes in microstructure throughout the print axis of the product (that is, the microstructure does not change or deteriorate, which often is the case with conventional alloy-based components that are made using additive manufacturing. The disclosed products thus exhibit thermal stabilities and mechanical strength not exhibited by traditional products formed with AM methods. AM methods also are described using the compositions disclosed herein.

To advance metal AM technologies while maintaining target properties, alloy compositions should be designed that mitigate these processing challenges. The present inventors have developed inventive alloys that are well-suited for AM technologies because they (and products formed with such alloys) resist substantial coarsening as described herein. Additionally, the disclosed AM methods and alloy compositions can be used to make products having a desired microstructure (or microstructures) by tuning particular processing parameters. For example, in some embodiments, single-line laser melts were made on cast Al—Ce plate embodiments using different beam velocities and the microstructure was evaluated in the as-melted and heat treated conditions. In particular disclosed embodiments, an extremely fine microstructure was observed within the weld regions, evolving from eutectic at the outer solid-liquid boundaries to a primary Al face-centered cubic ("FCC") dendritic/cellular structure nearer the melt-region centerline.

III. COMPOSITIONS AND PRODUCTS

Compositions used in the AM methods described herein include compositions comprising aluminum and at least one additional alloying component used to form an alloy with the aluminum. In particular disclosed embodiments, the additional alloying component is a rare earth component. In exemplary embodiments, the rare earth component comprises cerium, lanthanum, mischmetal, or any combination thereof.

AM methods described herein are used to prepare shaped alloy layers comprising aluminum-rare earth alloys. In some embodiments, the shaped alloy layers comprise, consist of, or consist essentially of aluminum and 4 wt % to 60 wt % of a rare earth component X having a maximum solid solubility of ≤0.5 wt % in aluminum. In particular disclosed embodiments, the shaped alloy layers comprise, consist of, or consist essentially of aluminum and 4 wt % to 20 wt % of a rare earth component X having a maximum solid solubility of ≤0.5 wt % in aluminum. In yet additional embodiments, the shaped alloy layers comprise, consist of, or consist essentially of aluminum and 20 wt % to 35 wt % of a rare earth component X having a maximum solid solubility of ≤0.5 wt % in aluminum. In yet additional embodiments, the shaped alloy layers comprise, consist of, or consist essentially of aluminum and 35 wt % to 60 wt % of a rare earth component X having a maximum solid solubility of ≤0.5 wt % in aluminum. "Consists essentially of" means that the alloy does not include additional components that affect the chemical and/or mechanical properties of the alloy by more than 10%, such as 5% to 2%, relative to a comparable alloy that is devoid of the additional components. In some embodiments, the shaped alloy layer comprises, consists of, or consists essentially of, 4 wt % to 8 wt %, 8 wt % to 12 wt %, 12 wt % to 20 wt %, 20 wt % to 35 wt %, 35 wt % to 60 wt %, 35 wt % to 52 wt %, or 52 wt % to 60 wt % of the rare earth element X, based on the total alloy composition. In certain embodiments, the alloy comprises 4 wt % to 45 wt %, 4 wt % to 35 wt %, 4 wt % to 20 wt %, 6 wt % to 18 wt %, 8 wt % to 16 wt %, or 10 wt % to 14 wt % of a rare earth component X, based on the total alloy composition. In certain examples, the shaped alloy layer comprises 8 wt %, 9 wt %, 10 wt %, 11 wt %, 12 wt %, 13 wt %, 14 wt %, 15 wt %, or 16 wt % of the rare earth component X, based on the total alloy composition.

In particular disclosed embodiments, the rare earth component X has a maximum solid solubility of ≤0.5 wt % in aluminum, such as a maximum solid solubility of ≤0.1 wt %, ≤0.01 wt %, ≤0.001 wt %, ≤1×10$^{-4}$ wt %, or even ≤1×10$^{-5}$ wt % in aluminum. In some embodiments, the rare earth component X has a maximum solid solubility in aluminum within a range of 1×10$^{-10}$ wt % to 1 wt %, 1×10$^{-10}$ wt % to 0.1 wt %, 1×10$^{-8}$ wt % to 0.01 wt %, 1×10$^{-8}$ wt % to 0.001 wt %, 1×10$^{-8}$ wt % to 1×10$^{-4}$ wt %, or 1×10$^{-7}$ wt % to 1×10$^{-5}$ wt %. This characteristic is in stark contrast to other metals and/or metalloids, such as magnesium and silicon, which are soluble or very soluble in aluminum (that is, they do not exhibit low solubility in aluminum).

Ce and La exhibit very similar atomic properties with the same number of valence electrons in the 6s energy orbital. They also exhibit a very similar atomic radius. The Al—Ce and Al—La phase diagrams in the aluminum rich region appear substantially identical with the only discernible difference being the depression in the primary $Al_{11}La_3$ liquidus temperature over that of the equivalent $Al_{11}Ce_3$ region. Furthermore if one observes the ternary isotherm plotted by the Al—La—Ce system at 500° C. it can be observed that Ce and La form mirrored phase spaces across constant Al isopleth lines.

Naturally occurring mischmetal may be a less expensive alternative than pure cerium and/or lanthanum. Natural mischmetal has a variable composition, but typically comprises, in terms of weight percent, 50 wt % cerium, 30 wt % lanthanum, balance other rare earth elements. Thus, modification of aluminum alloys with cerium through addition of mischmetal can be a less expensive alternative to pure cerium.

Through the addition of cerium, lanthanum, mischmetal, or combinations thereof (and even other rare earth components) in amounts in the range of 5 to 30 wt %, preferably 5 wt % to 20 wt %, or 6 wt % to 16 wt %, or 8 wt % to 12 wt %, aluminum alloys show a surprising and unexpected marked increase in high temperature mechanical properties. It has been found that combining aluminum with rare earth components is effective in producing aluminum alloys suitable for AM methods without the addition of silicon. Additionally, the rare earth component/aluminum alloys described herein can be used in AM processes to provide products that exhibit a uniform microstructure throughout a print axis of the product. Not only are such products resistant to microstructural changes (e.g., coarsening, particle density changes, particle size changes, or the like) during post-AM methods, particularly those that occur at high temperatures, but the layers that combine to form the products do not undergo deleterious microstructural changes during the AM process. Metal AM typically requires prior layers be held at high temperatures (300° C. or higher) for extended periods of time. Such AM methods thus can lead to reduced residual stress in the final part. For materials that coarsen, this can result in a gradient of structure and degradation of mechanical properties from the first layers printed to the last because the first layers printed are subjected to hours of a high temperature heat treatment, and are correspondingly coarse relative to more recent layers. This deviation can make it difficult to standardize properties and design parts to a specification. The disclosed alloys exhibit a thermal stability during the temperatures used in AM that other conventional alloys do not exhibit. For example, the disclosed alloys do not exhibit substantial coarsening during an AM process, whereas aluminum alloys without a rare earth component X, such as Al/Mg and/or Al/Si alloys, typically exhibit coarsening with concomitant reduction in strength when exposed to high temperatures, such as temperatures at or above 250° C. Such coarsening is due at least in part to diffusion of the minor component, e.g., Mg, into the aluminum at higher temperatures, both decreasing the volume percent of the intermetallic in the alloy and allowing the intermetallic to coarsen via movement of the minor component through the aluminum bulk phase. In contrast, however, some embodiments of the disclosed alloys exhibit little or no diffusion of the rare component X into the bulk regions of aluminum when exposed to high temperatures.

In addition to aluminum and the rare earth component X, the layers and/or products made using the disclosed AM methods can include other components including, but not limited to, Mg, Si, Fe, Ni, and/or Zn. For example, up to 5 wt % silicon can be added to improve yield and tensile strengths. Other additions of up to 5 wt % Fe, up to 15 wt % Mg, up to 8 wt % Cu, and/or up to 8 wt % Ni, are also useful in tailoring the alloy as desired. In any of the disclosed embodiments, the alloys may include other elements that are grain refiners and/or do not significantly affect formation and stability of the intermetallic phase. Such elements include, for example, Ti, V, and/or Zr. Moreover, the alloys may contain minor amounts (less than 5 wt %, such as less than 2 wt % or less than 1 wt %, or within industrial constraints or compositional tolerance levels for ASM indexed alloys (e.g., ASM Alloy Phase Diagram Database™ online database (ASM International)) of various impurities that have no substantial effect on the mechanical properties of the alloys, particularly yield strength, compared to a corresponding alloy that does not include the impurities.

In an embodiment where an alloy is a ternary alloy, the alloy composition may be represented by "Al-aX-bY" where "X" is the rare earth component, "Y" is another metal, and "a" and "b" indicate the percentages by weight of the total alloy composition of components X and Y. For example, Al-8Ce-10Mg indicates an alloy having 8 wt % Ce and 10 wt % Mg, with the balance being aluminum. The compositions of alloys including more than three elements can be written with similar notation. For example, Al-8Ce-4Si-1.5Mg-3Ni includes 8 wt % Ce, 4 wt % Si, 1.5 wt % Mg, and 3 wt % Ni, with the balance being aluminum.

In any of the disclosed embodiments, the alloys described herein may comprise a bulk metallic phase and an intermetallic phase. The bulk metallic phase comprises, consists of, or consists essentially of aluminum, and the intermetallic phase comprises, consists of, or consists essentially of aluminum and the rare earth component X. Certain embodiments of the disclosed alloy comprise, consist of, or consist essentially of from 5 wt % to 30 wt % of the intermetallic phase, such as from 7 wt % to 25 wt % or from 10 wt % to 20 wt % of the intermetallic phase.

When the alloy is a binary alloy of aluminum and the rare earth component X, the intermetallic phase may be an $Al_{11}X_3$ intermetallic phase. When the alloy is a ternary alloy, quaternary alloy, or the like, the intermetallic phase may have a different composition. For example, in an alloy comprising cerium, silicon, and aluminum, the intermetallic phase may include AlCeSi. The intermetallic phase may strengthen the alloy. In some embodiments, from 95 wt % to 100 wt % of the rare earth component X in the alloy is present in the intermetallic phase. For example, in any of the binary alloy embodiments disclosed herein, from 96-100 wt %, 97-100 wt %, 98-100 wt %, 99-100 wt %, 99.5-100 wt %, 99.7-100 wt %, or 99.9-100 wt % of the rare earth component X may be in the intermetallic phase of the alloy. Similarly, in any of the ternary, quaternary (or higher) alloy embodiments disclosed herein, from 96-100 wt %, 97-100 wt %, 98-100 wt %, 99-100 wt %, 99.5-100 wt %, 99.7-100 wt %, or 99.9-100 wt % of the rare earth component X may be in the intermetallic phase of the alloy. Stated another way from 95 wt % to 100 wt %, such as 96-100 wt %, 97-100 wt %, 98-100 wt %, 99-100 wt %, 99.5-100 wt %, 99.7-100 wt %, or 99.9-100 wt % of the rare earth component X in the alloy is excluded from the aluminum matrix or bulk phase. Elements other than the rare earth component X and aluminum may be present in the aluminum matrix, the intermetallic phase, and/or in separate regions within the alloy.

In some embodiments, the alloys used in the AM methods described herein and that form product embodiments made using such methods comprise, consist of, or consist essentially of aluminum and the rare earth component X. As indicated above, "consists essentially of" means that the alloy does not include additional components that affect the chemical and/or mechanical properties of the alloy by more than 10%, such as 5% to 2%, relative to a comparable alloy that is devoid of the additional components. For example, the alloy may comprise, consist of, or consist essentially of 4-20 wt %, 6-18 wt %, 8-16 wt %, or 10-14 wt % of the rare earth component X, based on the total alloy composition, with the balance being aluminum. In certain embodiments, the alloy comprises, consists of, or consists essentially of aluminum, the rare earth component X, and one or more of Mg, Si, Fe, Ni, and Zn. In some examples, the alloy comprises, consists of, or consists essentially of, 4 wt % to 20 wt % Ce, La, mischmetal, or a combination thereof, 0 wt % to 15 wt % Mg, 0 wt % to 12 wt % Si, 0 wt % to 6 wt % Fe, 0 wt % to 5 wt % Ni, and 0 wt % to 6 wt % Zn, with the balance being aluminum. In certain examples, the alloy comprises, consists of, or consists essentially of, 4 wt % to 20 wt % Ce, La, mischmetal, or a combination thereof, 0 wt % to 15 wt % Mg, 0 wt % to 12 wt % Si, 0 wt % to 6 wt % Fe, 0 wt % to 5 wt % Ni, and 0 wt % to 6 wt % Zn, with the balance being aluminum. When the alloy includes mischmetal, the percentages of other components, such as Fe, Si, and Mg, are in addition to the amounts of those components provided by the mischmetal itself. In an independent embodiment, the alloy comprises, consists of, or consists essentially of, 6 wt % to 18 wt % Ce, La, mischmetal, or a combination thereof, 0 wt % to 15 wt % Mg, 0 wt % to 12 wt % Si, 0 wt % to 6 wt % Fe, 0 wt % to 5 wt % Ni, and 0 wt % to 6 wt % Zn, with the balance being aluminum. In another independent embodiment, the alloy comprises, consists of, or consists essentially of, 8 wt % to 16 wt % Ce, La, mischmetal, or a combination thereof, 0 wt % to 15 wt % Mg, 0 wt % to 12 wt % Si, 0 wt % to 6 wt % Fe, 0 wt % to 5 wt % Ni, and 0 wt % to 6 wt % Zn, with the balance being aluminum. In yet another independent embodiment, the alloy comprises, consists of, or consists essentially of, 10 wt % to 14 wt % Ce, La, mischmetal, or a combination thereof, 0 wt % to 15 wt % Mg, 0 wt % to 12 wt % Si, 0 wt % to 6 wt % Fe, 0 wt % to 5 wt % Ni, and 0 wt % to 6 wt % Zn, with the balance being aluminum. In still another independent embodiment, the alloy comprises, consists of, or consists essentially of, 8 wt % to 16 wt % Ce, La, mischmetal, or a combination thereof, 0.1 wt % to 2 wt % Mg, 0.5 wt % to 5 wt % Si, and 0.5 wt % to 5 wt % Ni. In another independent embodiment, the alloy comprises, consists of, or consists essentially of, 8 wt % to 16 wt % Ce, La, mischmetal, or a combination thereof, 0.1 wt % to 5 wt % Mg, and 1 wt % to 10 wt % Si. In yet another independent embodiment, the alloy comprises, consists of, or consists essentially of, 8 wt % to 16 wt % Ce, La, mischmetal, or a combination thereof, 0.1 wt % to 2 wt % Mg, 1 wt % to 10 wt % Si, and 0.5 wt % to 5 wt % Ni. In still another independent embodiment, the alloy comprises, consists of, or consists essentially of, 8 wt % to 16 wt % Ce, La, mischmetal, or a combination thereof, and 1 wt % to 15 wt % Mg. In certain working embodiments, the rare earth component was Ce.

In some embodiments, the compositions used in the AM methods described herein are powder-based compositions. The powder-based compositions can comprise a mixture of the above-listed components, typically in powder form. Any powder particle/grain size suitable for AM techniques can be used and a person of ordinary skill in the art with the guidance of this disclosure would recognize such suitable particle/grain sizes. In yet other embodiments, wire feedstocks can be used to form the alloys described herein.

Products made using the compositions described above and the methods disclosed herein can be any product capable of being formed using an AM process. In particular disclosed embodiments, the products are components used in the automotive, locomotive, aircraft, and aerospace industries. Some exemplary products include, but are not limited to, automotive powertrain components (such as engine cylinder heads, blocks, water cooled turbocharger manifolds, and other automotive components), aerospace components, heat exchanger components, and any other components requiring aluminum alloys that are stable at high temperatures (e.g., temperatures such as 150° C. to 350° C. or higher). In an independent embodiment, the products of the present disclosure do not include cast alloy products and instead include products that are formed using AM techniques, such as energy source-mediated layer-by-layer manufacturing processes (e.g., laser AM, electron beam AM, induction-mediated AM, and the like).

The products made using the AM methods and compositions described herein comprise a uniform microstructure that is maintained throughout the print axis of the product. In some embodiments, the products may have at least one layer (typically formed during a final layer forming step in the additive manufacturing process) having a microstructure that is different from the microstructure of other layers forming the product. Additionally, the products described herein exhibit uniform bulk mechanical properties, such as, but not limited to, hardness, tensile strength, compressive strength, and the like. Such mechanical properties can be measured using suitable techniques recognized by those of ordinary skill in the art with the benefit of the present disclosure. In particular embodiments, a Vickers hardness test (e.g., ASTM method E384), a uniaxial tension test (e.g., an ASTM B557 test for Al and Mg and/or an ASTM E8/E8M test for metallic materials), and/or a compression test (e.g., an ASTM E9 test for compression for metallic materials) can be used. In some embodiments, the Vickers hardness of the product changes by less than 20% when exposed to a 500° C. environment for 1500 hours or more. In particular disclosed embodiments, the Vickers hardness of the product changes by less than 20% when exposed to a 400° C. environment for 24 hours. In an independent embodiment, the products may comprise a majority of shaped alloy layers comprising the inventive alloys described herein and may be modified to further comprise one or more layers of an alloy that does not comprise aluminum and/or a rare earth component (as required by the inventive alloys disclosed herein). As such, the present disclosure not only concerns products made solely with aluminum alloys comprising a rare earth component, but it also concern products that have been modified or manufactured to comprise other alloys. Such products, however, may or may not exhibit the ability to avoid substantial coarsening (which can depend on the amount of the non-inventive alloy present, such as the number of shaped layers using such non-inventive alloys and/or the thickness/amount of non-inventive alloy added as a coating to a final product) and this can readily be determined by a person of ordinary skill in the art with the benefit of this disclosure.

The products include multiple adjacent (or immediately adjacent) shaped alloy layers that are formed on one another during the layer-by-layer process of the AM method embodiments. The shaped alloy layers of the disclosed products have a corresponding microstructure that does not exhibit substantial coarsening and the microstructure of each layer is not affected by thermal history (that is, by the number of energy source melting cycles used during the method and/or by any holding/bed temperatures used during the method). In some embodiments, portions of each prior-formed alloy layer (that is, a layer that is formed by melting of a powder-based composition during the AM process) can be re-melted such that that portion of the prior-formed alloy layer becomes part of the layer being formed on the prior-formed layer, which results in fusing the layers. In some embodiments, the melting process that forms each new layer of the product can result in a portion of one, two, three, four, or more prior-formed layers being remelted. As such, a product formed using the AM processes described herein may exhibit a layering pattern when cut along the print axis. For example, products obtained using the AM methods disclosed herein can exhibit one or more layers formed during the AM method that can be observed by examining a cross-section of the product (typically a cross-section along a print axis) with SEM analysis, optical microscopy, electron microscopy, X-ray diffraction, or the like. Such a layer can be a distinct shaped alloy layer deposited during the AM method, or it can comprise multiple (e.g., two or more) shaped alloy layers that, while deposited as distinct shaped alloy layers during the AM method, have been remelted during the AM process to form a single layer within the product. In particular disclosed embodiments, the microstructure of a shaped alloy layer and/or a product formed using an AM method described herein can be purely eutectic or semi-eutectic. In yet additional embodiments, a minimal amount of dendrites or cells may form within the microstructure of a shaped alloy layer or AM-manufactured product, wherein spaces or voids between the dendrites and/or cells are occupied with a eutectic composition.

IV. METHODS

Disclosed herein are embodiments of an AM method utilizing the alloy compositions described herein. The AM method embodiments described herein can involve layer-by-layer manufacturing methods suitable for metal alloys, such as direct metal laser sintering, electron beam melting, selective heat sintering, selective laser melting, selective laser sintering, and microinduction. In particular disclosed embodiments, the AM method can comprise forming a first layer with a first composition comprising aluminum and at least one additional alloying metal; forming a first shaped alloy layer from the first composition by exposing all or a portion of the first layer to an energy source; forming a second layer on the first shaped alloy layer with a second composition comprising aluminum and at least one additional alloying metal; and forming a second shaped alloy layer from the second composition by exposing all or a portion of the second layer to an energy source, thereby forming a second shaped alloy layer adjacent to the first shaped alloy layer. In some embodiments, the method can further comprise maintaining the first alloy layer and the second alloy layer at a holding temperature ranging from 300° C. to 400° C. during the AM method.

In some method embodiments, the steps of adding layers and/or forming shaped alloy layers can be performed in any suitable order. For example, a first shaped alloy layer can be formed before or after a second shaped alloy layer is formed. In some embodiments, one or more intervening shaped alloy layers can be formed between the first and second shaped alloy layers. In yet additional embodiments, one or more shaped alloy layers can be formed prior to forming the first shaped alloy layer and/or one or more shaped alloy layers can be formed after forming the second shaped alloy layer. In yet additional embodiments, the steps of the disclosed method embodiments can be repeated any number of times.

In particular disclosed embodiments, the additional alloying metal used in the AM method is selected to have maximum solid solubility of ≤0.5 wt % in aluminum. Additional alloying metals having a maximum solid solubility of ≤0.5 wt % in aluminum can be used in each composition used to form layers of the product formed using the AM method, or can be used in only certain compositions used to form such layers. Each composition used in the AM method can be the same or different in terms of compositional components and/or compositional amounts.

Energy sources that can be used in the AM method embodiments described herein can include laser devices, electron beam devices, electromagnetic induction devices, and the like. Lasers emitting visible, near-infrared, or infrared light may be suitable. In certain examples, a laser system from DM3D Technology, LLC (Auburn Hills, Mich.) was used. In some embodiments, the method can comprise using electromagnetic induction to melt the layers into shaped alloy layers. In a high frequency (>100 kHz) and high power (>1 kW) system, electrical currents can be induced locally in deposited layers of alloy compositions described herein, providing resistive heating and melting. The penetration depth/thickness (e.g., the number of layers that can be melted and/or the number of shaped alloy layers that can be remelted) of these currents can be controlled by material resistivity, magnetic permeability, and the frequency of induction. Power is provided by an induction coil, such as a water-cooled copper coil, through which high current alternating current is passed. The geometry of the induction coils can be selected to suit specific desired geometries. For instance, portions of a flat layer of powder could be treated by a circular coil. In this manner, a large area could be treated by rastering either the building layers or the coil.

In particular disclosed embodiments of the AM method described herein, the properties of the formed product (or a particular region of the product) can be tailored by modifying an operational parameter of the AM method. For example, the microstructure of each shaped alloy layer (or the microstructure of the product) can be tuned/changed and/or fused by modifying a parameter of the energy source. In particular described embodiments utilizing a laser energy source, the power, velocity, spot size, or any combination thereof of the laser source can be modified to provide changes in the microstructure of one or more shaped alloy layers or even a particular region of such layers. For example, the interlamellar spacing and/or lamellae thickness of eutectic regions of the shaped alloy layers can be modified by adjusting laser power, beam velocity and/or spot size. Solely by way of example, in some exemplary embodiments discussed herein, utilizing a laser beam velocity of 100 mm/min provides a deeper eutectic region within an alloy layer, whereas increasing the laser beam velocity to 300 mm/min provides a smaller thickness of the eutectic region. See, for example, FIGS. 2A-2C and FIGS. 3A-3C. In yet additional embodiments using an electron beam device, electron beam current, velocity, spot size, and/or accelerating voltage can be modified to change the microstructure of shaped alloy layers and/or the final product. In yet additional embodiments using an induction device, induction alternating current frequency can be modified to melt and change the microstructure of shaped alloy layers and/or the final product. In exemplary embodiments utilizing a laser energy source, suitable operational parameters can include a laser power and velocity sufficient to melt at least one layer of a feedstock composition and further sufficient to melt one or more shaped alloy layers formed prior to deposition of the layer of the feedstock composition (thus the laser not only melts the new feedstock composition layer, but also penetrates to melt one or more prior formed layers (feedstock composition layers and/or shaped alloy layers) positioned adjacent to (or immediately adjacent to) the feedstock composition layer.

Any suitable feedstock can be used in the AM method embodiments described herein. Exemplary feedstocks include, but are not limited to, powder feedstocks, wire feedstocks, or the like.

V. EXAMPLES

Embodiments described below use laser melting and its rapid cooling conditions to show that AM components made with Al—Ce alloys can achieve mechanical properties superior to their cast counterparts, and to explore the design space offered by process-microstructure correlations. In some embodiments, the hardness of the laser welded regions were compared to an as-cast structure. Heat treatment embodiments also are utilized to imitate conditions similar to those that would be involved during prolonged use of products described herein at elevated temperature typically involved in end user applications and/or thermal cycling steps involved in AM methods. The microstructure in the weld region is evaluated and differences in structure are provided in a microstructure selection map based on non-equilibrium theory for planar, dendritic, and eutectic growth.

An alloy component of Al-8Ce was prepared as described above. The surface was divided into 9 regions and each region was laser melted under the conditions shown in Table 1. SEM micrographs of melt regions 1-6 were obtained and the melt regions were measured. A line was drawn along the surface outside of the region to serve as a fiducial mark. All other measurements were made perpendicular or parallel to this line. Melt region thickness was measured from the bottom-most melted portion to the surface line. Region height was measured as the height of any bead above the surface line. Melt region width is the width of the region at the surface line, and half-height width is the width of the melt region at half of the melt region thickness away from the surface line.

TABLE 1

| | Al—8Ce | | | | | | | | |
|---|---|---|---|---|---|---|---|---|---|
| | 1 | 2 | 3 | 4 | 5 | 6 | 7 | 8 | 9 |
| Power (W) | 800 | 800 | 800 | 600 | 600 | 600 | 400 | 400 | 400 |
| Rate (mm/min) | 400 | 600 | 800 | 400 | 600 | 800 | 400 | 600 | 800 |
| Region thickness (μm) | 210 | 294 | 246 | 144 | 138 | 81 | — | — | — |
| Surface Height (μm) | 30.7 | 0 | 24 | 33 | 21 | 0 | — | — | — |
| Surface Width (μm) | 863 | 1206 | 1152 | 901 | 888 | 621 | — | — | — |
| Half-Height Width (μm) | 698 | 888 | 912 | 612 | 528 | 267 | — | — | — |
| FIG(S). | 4A-4C | 5A-5D | 6A-6E | 7 | 8 | 9 | — | — | — |

Figures 19A, 19B:
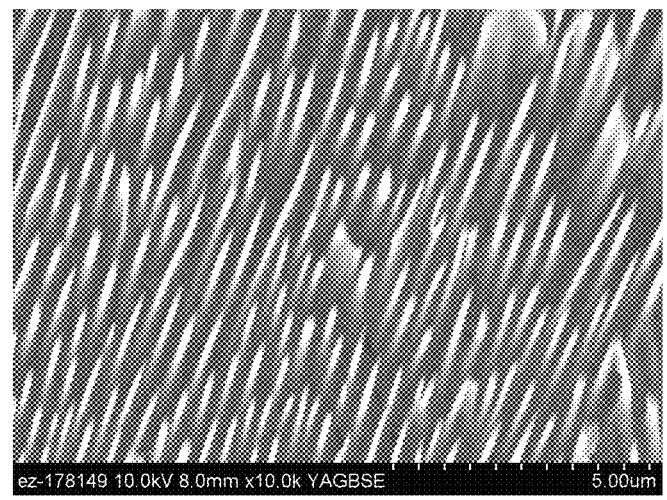
FIGS. 19A and 19B are a schematic showing laser-melting parameters and configurations described here (FIG. 19A) and an SEM micrograph (FIG. 19B) showing the ultra-fine nanoscale eutectic structure in a laser-melted Al-12Ce alloy.

An alloy component of Al-12Ce was prepared as described above. The surface was divided into 9 regions and each region was melted with a laser under the conditions shown in Table 2 (see, for example, FIG. 19A). SEM micrographs of the melt regions were obtained and the melt regions were measured. An additional SEM micrograph of a laser-melted Al-12Ce embodiment, which shows the ultrafine nanoscale eutectic structure obtained, is shown in FIG. 19B.

TABLE 2

| | Al—12Ce | | | | | | | | |
|---|---|---|---|---|---|---|---|---|---|
| | 1 | 2 | 3 | 4 | 5 | 6 | 7 | 8 | 9 |
| Power (W) | 1000 | 1000 | 1000 | 900 | 900 | 900 | 800 | 800 | 800 |
| Rate (mm/min) | 200 | 500 | 800 | 200 | 500 | 800 | 100 | 200 | 300 |
| Region thickness (μm) | 459 | 372 | 393 | 384 | 384 | 414 | 354 | 354 | 348 |
| Surface Height (μm) | 21 | 18.2 | 0 | 0 | 0 | 36 | 24 | 0 | 51 |
| Surface Width (μm) | 1608 | 1473 | 1419 | 1782 | 1398 | 1473 | 1428 | 1350 | 1359 |

TABLE 2-continued

| | Al—12Ce | | | | | | | | |
|---|---|---|---|---|---|---|---|---|---|
| | 1 | 2 | 3 | 4 | 5 | 6 | 7 | 8 | 9 |
| Half-Height Width (μm) | 1353 | 1209 | 1174 | 1077 | 1179 | 1173 | 1148 | 1128 | 1101 |
| FIG(S). | 10A-10D | 11 | 12 | 13 | 14 | 15 | 16A-16G | 17A-17F | 18A-18F |

The suitability of a hypereutectic Al-12Ce alloy for AM was investigated using single-line laser melts on a flat plate. The plate was machined from a cast ingot with composition prepared by alloying liquid Al at 750° C. with the appropriate amount of Ce. Small plates were machined from the resulting ingots, and the surface was grit blasted to improve laser absorption. To make the single-line laser melts, a diode laser with a 910 nm wavelength and 1.5 mm spot size was used. A laser power of 800 W was used with three different beam velocities in an argon atmosphere. To assess the thermal stability of the laser melted microstructure, samples were heat treated at 300° C. for 24 hours. Following processing, samples were sectioned on the plane normal to the beam travel direction, polished, and etched using a highly diluted Keller's reagent. Optical and scanning electron microscopy was used to characterize the microstructure was then characterized and ImageJ was used for measurements of the eutectic spacing. Vickers microhardness was used to characterize the difference in mechanical properties between the as-cast material and the laser welded microstructure and as a function of heat treatment. TEM lamella were prepared via the focused-ion-beam (FIB) in situ lift-out technique using a Hitachi NB5000 FIB-SEM, and were examined by S/TEM using an FEI Talos F200X operated at 200 kV and equipped with an extreme field emission gun (X-FEG) electron source and Super-X EDS (energy-dispersive spectroscopy) system with 4 Silicon drift detectors (SDD) for chemical analysis.

TABLE 3

Design matrix for examining the weldability of two Al—Ce alloys under various laser power and beam velocity conditions (all composition values are in wt %).

| Composition | Sample number | Laser Power (W) | Beam Velocity (mm/min) |
|---|---|---|---|
| Al—12Ce | B7 | 800 | 100 |
| | B8 | 800 | 200 |
| | B9 | 800 | 300 |

The effect of local variations in solidification conditions within the weld region and as a function of the beam velocity and alloy composition was evaluated.

Results

Weld Region Microstructure—For all the process parameters tested, no cracking or significant porosity was observed. FIGS. 2A-2C and FIGS. 3A-3C show a comparison of the weld regions for the three beam velocities. As the beam velocity increased, the width of the weld region decreased by approximately 4%. A higher magnification of the weld microstructure is shown in FIGS. 23A and 23B for the slowest beam velocity of 100 mm/min. Within the laser melted region, three different microstructures are present. Near the edge of the weld region where the interface velocity is low and thermal gradient high, the microstructure is entirely eutectic. Moving inward towards the center of the weld region, the velocity increases and thermal gradient decreases, causing instabilities in the eutectic growth before the microstructure shifts to a dendritic/cellular Al growth with a fine eutectic structure in the interdendritic/intercellular region. Outside of the laser melted region, note the lack of any significant microstructural changes in the heat affected zone (HAZ).

Figures 3A, 3B, 3C:
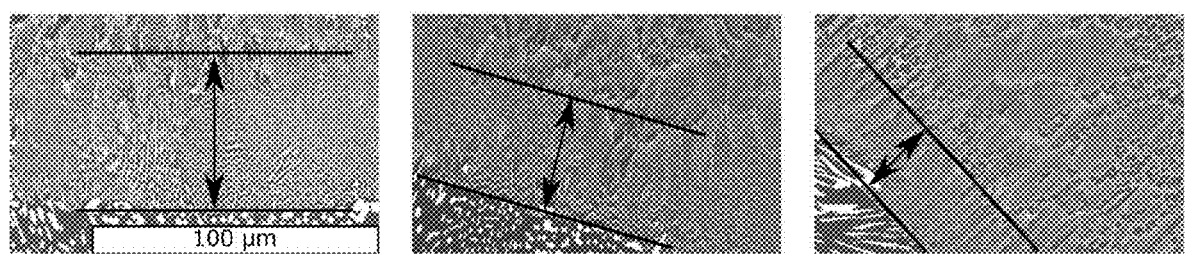
FIGS. 3A-3C are scanning electron micrographs of weld cross-sections formed using different laser beam velocities illustrating the eutectic region thickness at the edge of the weld region as a function of beam velocity (distance shown is from edge of weld region to the beginning of unstable eutectic growth)
Figure 4A:
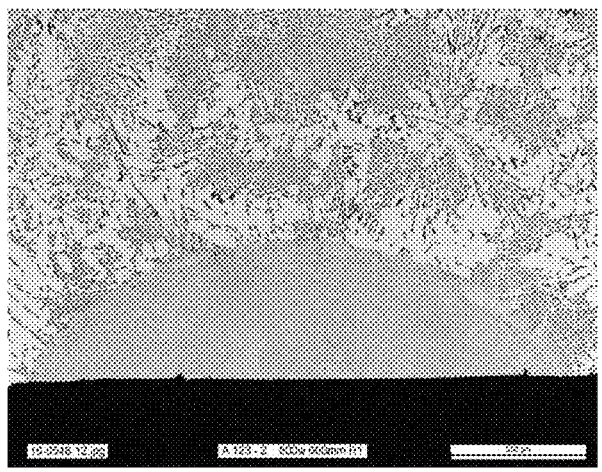
FIGS. 4A-4C include an optical micrograph of an exemplary melt region on a laser-melted Al-8Ce alloy (FIG. 4A), an SEM micrograph of the eutectic Al—$Al_{11}Ce_3$ structure near the edge of the weld (FIG. 4B), and a high-magnification SEM micrograph of the eutectic Al—$Al_{11}Ce_3$ structure (FIG. 4C); the melt region was obtained with an 800 W laser at a rate of 400 mm/minute.
Figure 4B:
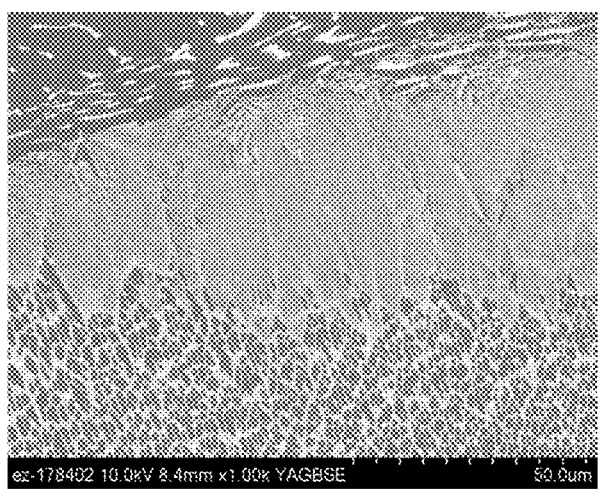
Figure 4C:
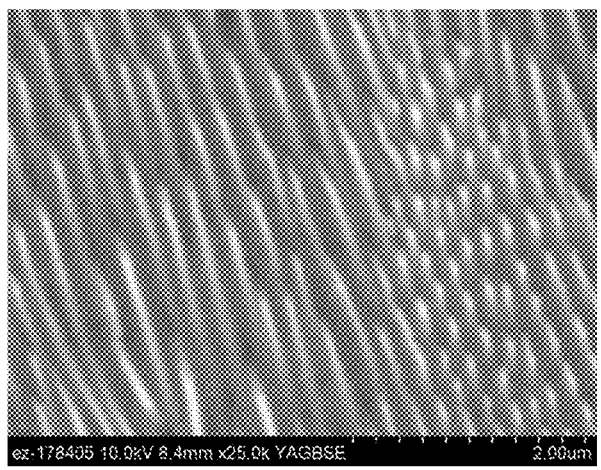
Figure 5A:
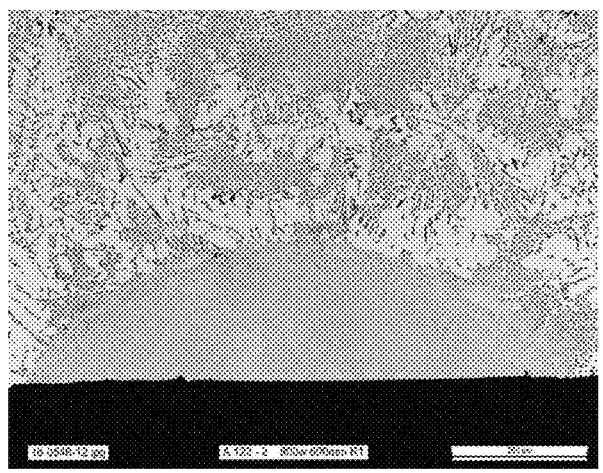
FIGS. 5A-5D include an optical micrograph of an exemplary melt region on a laser-melted Al-8Ce alloy (FIG. 5A), an SEM micrograph showing the size difference between the as-cast and laser-melted microstructures (FIG. 5B), an SEM micrograph of dendritic structure near the center of the melt region (FIG. 5C), and an SEM micrograph showing the small spacing in the eutectic Al—$Al_{11}Ce_3$ structure (FIG. 5D); the melt region was obtained with an 800 W laser at a rate of 600 mm/minute.
Figure 5B:
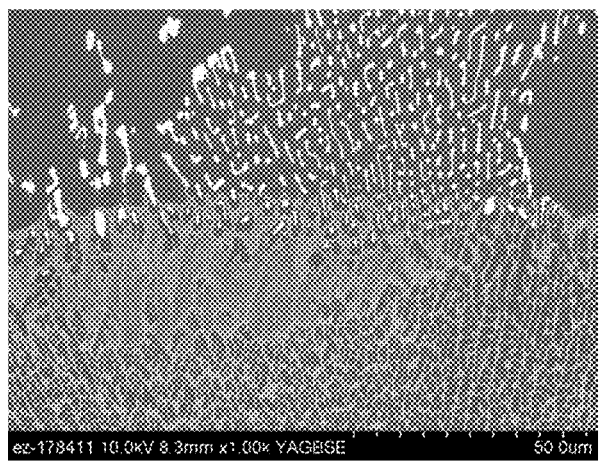
Figure 5C:
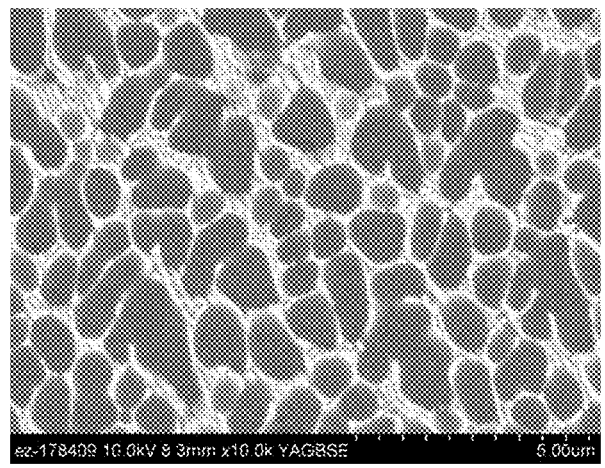
Figure 5D:
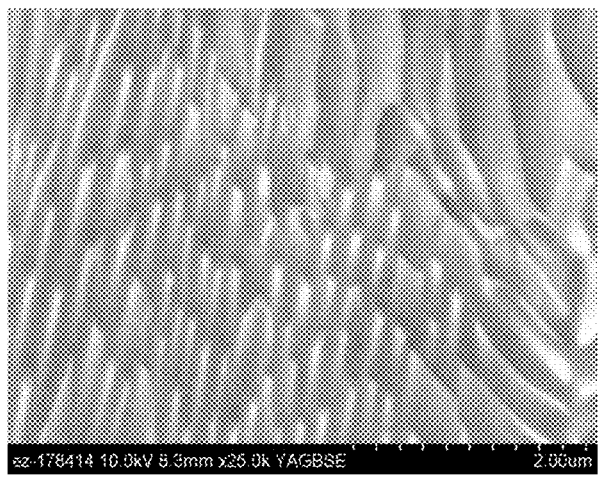

FIGS. 24A-24I show higher magnification views of these three regions for all three beam velocities. The primary difference between the three cases is the spacing in the eutectic structure at the outer radius of the laser melted region. In addition, as shown in FIGS. 3A-3C, the thickness of the fully eutectic region at the outer radius of the weld region tended to decreased with increasing beam velocity. No primary $Al_{11}Ce_3$ particles were found in the hypereutectic Al-12Ce microstructures (although they did begin to see primary $Al_{11}Ce_3$ in cast microstructures for Al-16Ce alloys). Instead, primary Al was observed for all cases.

Heat Treated Microstructure—To establish the thermal stability of the ultra-fine microstructure observed in the laser melted samples, the material was heat treated at the target operating temperature of 300° C. for 24 hours. The microstructure of the heat treated samples are shown in FIGS. 25A-25I. Again, near the outer radius of the weld region, a eutectic structure is observed, which becomes unstable as the growth velocity increases towards the center of the weld, eventually resulting in a primary Al dendritic/cellular structure. As compared to the as-melted structures in FIGS. 24A-24I, no substantial coarsening of the microstructure is observed. A complete comparison of the differences in length scales across these conditions (as-cast, as-melted, and heat treated) are shown in FIGS. 26A-26D for a beam velocity of 300 mm/min, including a high magnification of the fine rod-like eutectic structure at the edge of the weld region.

Hardness Results—Vickers micro-hardness results for the 200 mm/min beam velocity in both the as-melted and heat treated conditions are shown in FIGS. 27A, 27B, 28A, and 28B. For the as-melted condition, the hardness in the weld region is significantly higher than that in the cast material. The cast microstructure exhibits hardness of approximately 40-50 HVN, while the fine microstructure in the weld region increased to about 60-70 HVN, marking about a 30-40% increase. Some areas of extremely low hardness in the cast material are due to porosity. Similar trends in hardness are found for the heat treated condition (FIG. 27A). The heat treated sample shows a slightly higher hardness in the laser melted region, but this is likely caused by minor process variations. The higher hardness also corresponds to a slightly finer eutectic. The distributions of hardness values are shown in the histogram in FIG. 29. The distributions are predominantly bimodal, showing a collection of moderate hardness values corresponding to the cast material, and peaks at higher hardness values for the laser melted regions. Several very low data points caused by porosity are also evident.

The microstructures under consideration in this example were the eutectic Al—Al$_{11}$Ce$_3$ structure, dendritic/cellular growth for either primary Al or Al$_{11}$Ce$_3$, planar front growth for the two phases, and banded structures that oscillated between planar and dendritic growth.

Figure 20A:
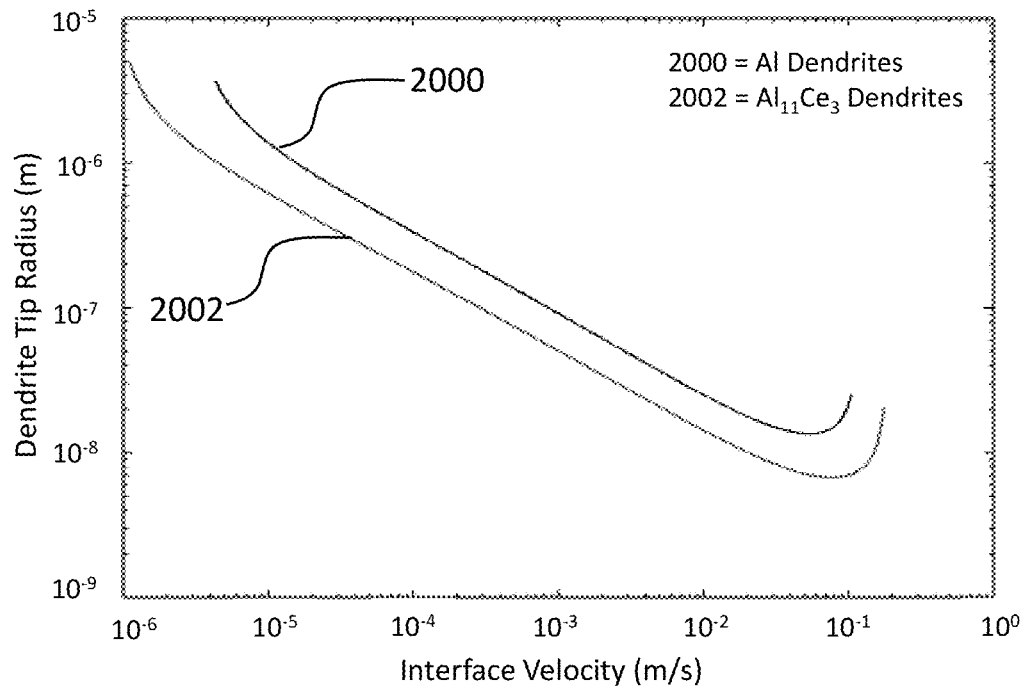
FIGS. 20A and 20B are graphs showing results from a microstructure selection model showing the dendrite tip radii vs. solidification front interface velocity.
Figure 20B:
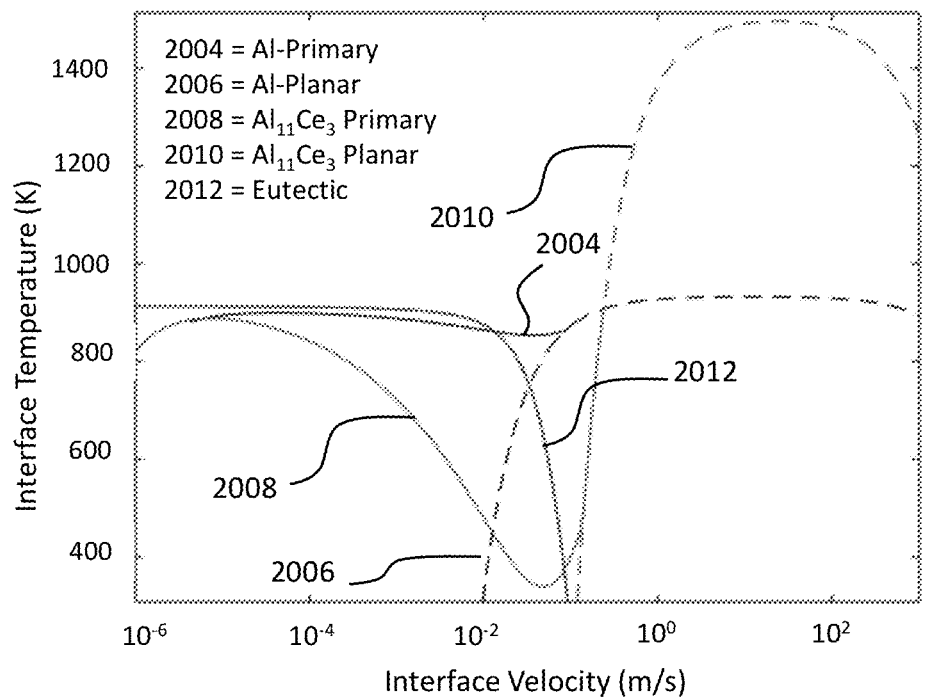

In one embodiment, the maximum interface temperature approach was used to determine the relative phase stability of different alloys at a particular interface front velocity, V, and thermal gradient, G. In this example, the stable structures are those with the highest growth temperature. Exemplary results are shown in FIGS. 20A and 20B for the dendrite tip radius of the two possible primary phases (Al and the Al$_{11}$Ce$_3$ intermetallic) as well as the variation in interface growth temperatures with velocity, all for an Al-12Ce alloy. Similar solutions were produced for each combination of interface growth velocity, alloy composition, and thermal gradient. The most stable microstructure was recorded in each case to produce the plots shown in FIGS. 21A and 21B.

Figure 22:
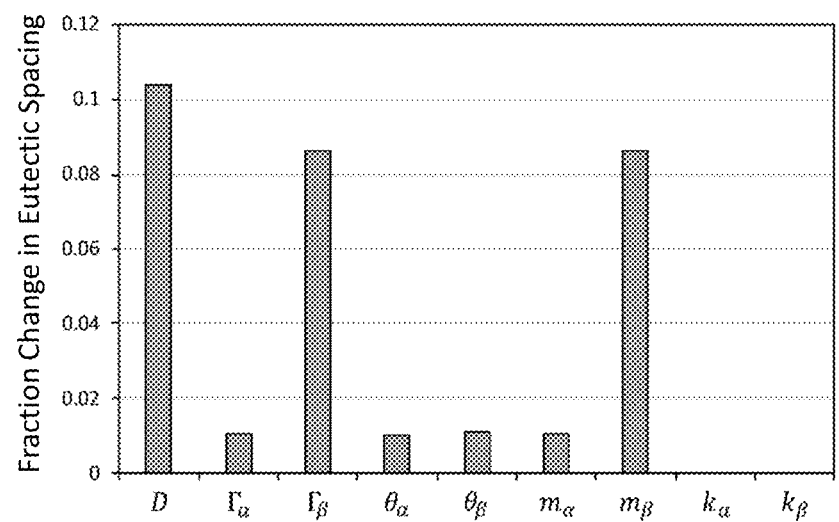
FIG. 22 shows results from a sensitivity analysis of eutectic spacing relative to a variety of input parameters showing the change in eutectic spacing as a fraction of the mean value for a ±10% change in a given input; an interface growth velocity of 200 mm/min was used and the nominal lamellar spacing was 0.463 μm.
Figure 25A:
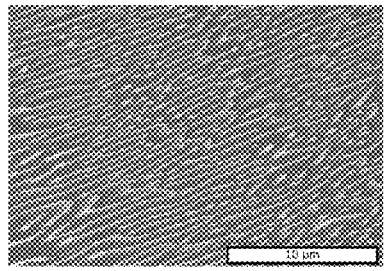
FIGS. 25A-25I are high magnification views of differences in microstructure at different points in the weld region for the three beam velocities utilized to obtain the images shown by FIGS. 3A-3C.
Figure 25B:
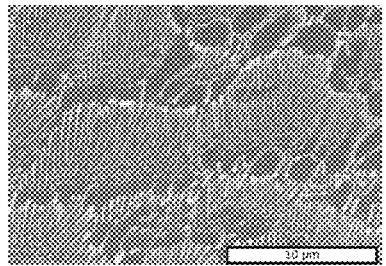
Figure 25C:
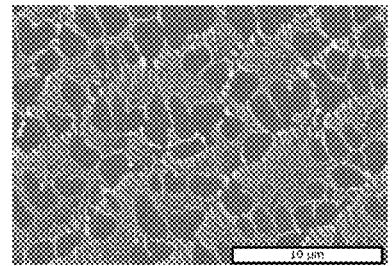
Figure 25D:
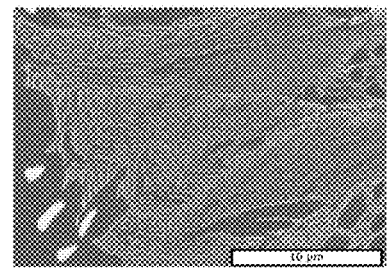
Figure 25E:
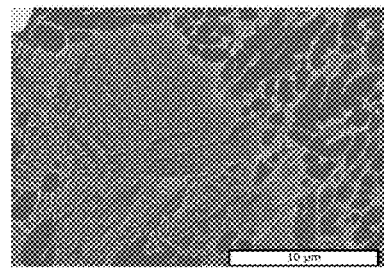
Figure 25F:
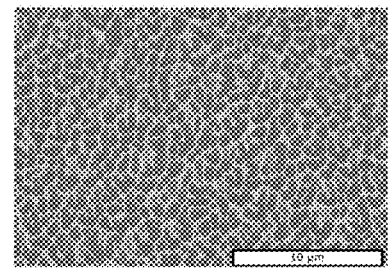
Figure 25G:
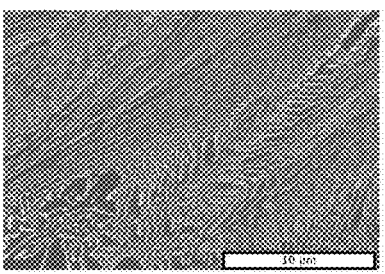
Figure 25H:
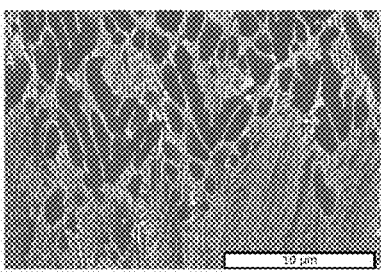
Figure 25I:
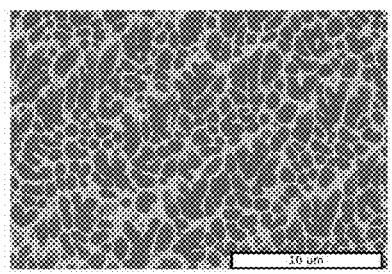
Figure 26A:
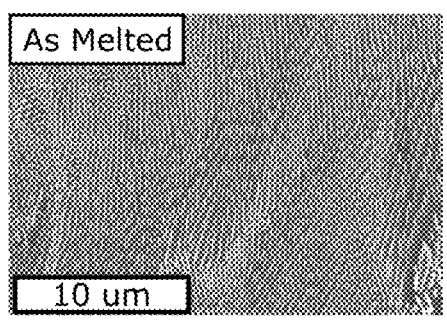
FIGS. 26A-26D are SEM micrographs showing the laser-melted and re-solidified surface microstructure (FIG. 26A), the interface of the laser-melted surface microstructure and as-cast microstructure (FIG. 26B), and the surface microstructure after heat treatment at 300° C. for 24 hours (FIGS. 26C and 26D) of an Al-12Ce alloy with laser melting treatment by an 800 W laser having a movement rate of 300 mm/minute.
Figure 26B:
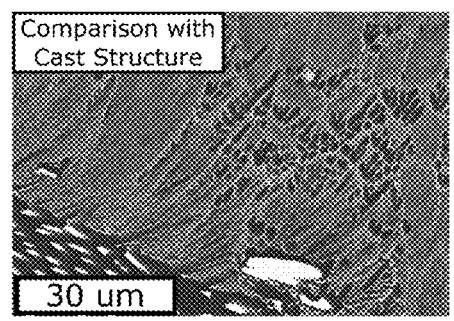
Figure 26C:
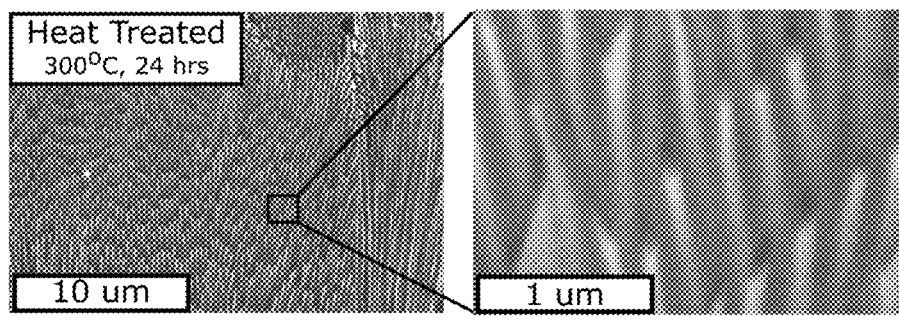
Figure 26D:
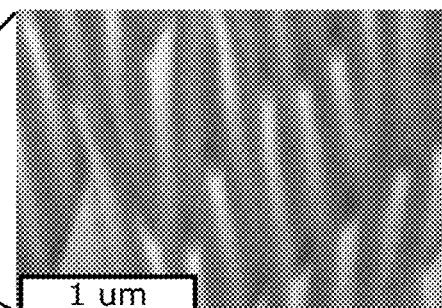

In one example, a crude local sensitivity analysis was performed by varying each of a variety of inputs by ±10% from their nominal values for a beam velocity of 200 mm/min. The estimated lamellar spacing for the nominal values was 0.463 µm. The fraction difference in the estimated lamellar spacing for the given variation in each input is shown in FIG. 22. In this example, the mass diffusivity, the Gibbs-Thomson coefficient for Al$_{11}$Ce$_3$ and the liquidus slope for Al$_{11}$Ce$_3$ have the greatest effect on the lamellar spacing. The mass diffusivity and Gibbs-Thomson coefficient impact the spacing estimation. On the other hand, the contact angles between the solid phases and the liquid and the Gibbs-Thomson coefficient for Al have a comparatively minor influence on the eutectic model. Moreover, because of their extremely small values in the Al—Ce system, changes in the partition coefficients have essentially no effect on the eutectic spacing.

Figure 30:
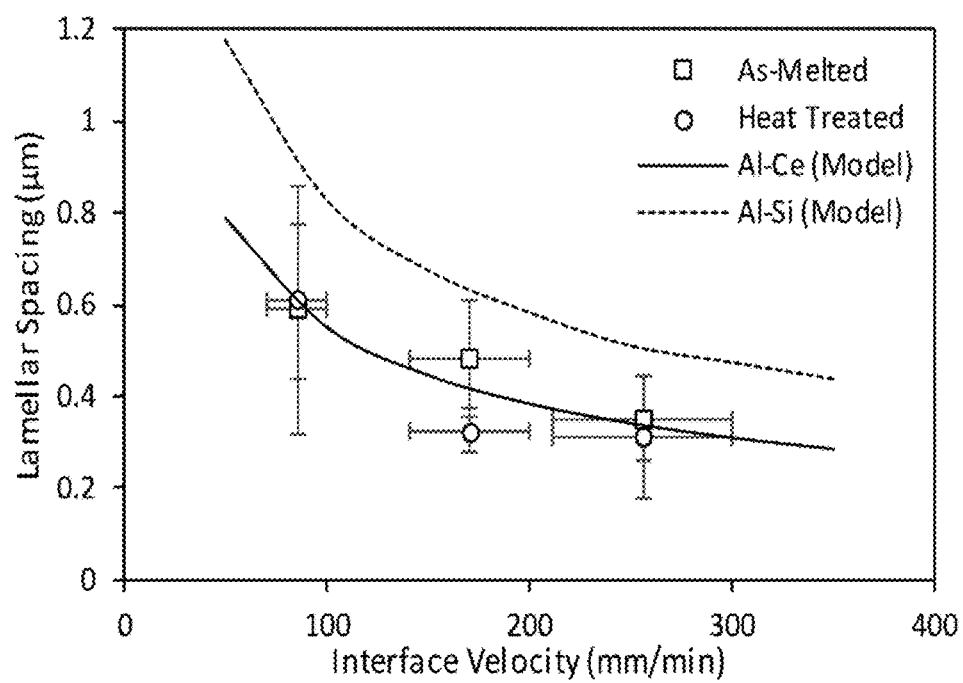
FIG. 30 is a graph showing a comparison of eutectic spacing between the microstructural theory and experimental results, wherein data is taken from both the as-melted and heat treated conditions; horizontal error bars show the variation in velocity between an interface moving parallel to the beam and at a 45° angle and vertical error bars indicate two standard deviations above and below the mean values; model results are shown for Al—Ce as well as a comparison to the predicted eutectic spacing for Al—Si under the same conditions; the mass diffusivity used for Al—Ce was $10^{-9}$ m$^2$/s.

Measurements taken from the fully eutectic region at the outer radius of the weld regions are shown in FIG. 30 for both the as-melted and heat treated conditions, where the vertical errors bars indicate ±2 standard deviations in the eutectic spacing measurements. The relevant velocity that governs solidification kinetics is the interfacial growth velocity, which varies throughout the weld region as a function of the beam velocity and the angle between the beam direction and the local growth vector. Since this information is not known for each of the measurements taken, horizontal error bars are shown which vary from the maximum velocity (the beam velocity) to a growth velocity for a 45° angle between the growth direction and beam direction. The eutectic spacing did not coarsen in the heat treated samples. The particularly small eutectic spacing observed for the heat treated sample at a beam velocity of 200 mm/min was likely due to process inhomogeneities as it corresponded with a small observed region of local remelting. Otherwise, the eutectic measurements are identical between the two conditions. The eutectic spacing for all cases fell between approximately 0.2 and 0.8 µm, which is small compared to the cast structure which had an average spacing of 1.7 µm, with a wide standard deviation of 1.08 µm.

Based on the available data, it appears that a reduced mass diffusivity ($10^{-9}$ m$^2$/s) compared to that of Al—Si can be obtained, comparing both the thermal stability of the microstructure and the eutectic growth. In eutectic growth, this difference in diffusivity manifests as a change in the diffusion distance over which solute transport occurs during the coupled Al and Al$_{11}$Ce$_3$ growth. These curvature effects may also have a significant effect on the coarsening kinetics in the Al—Ce system. In general, an increase in the Gibbs-Thomson coefficient will tend to increase both the eutectic spacing and the rate of coarsening.

The microstructural maps generated using the procedures described above are shown in FIGS. 21A and 21B. The plots are generated over a range of compositions and interface velocities for a constant thermal gradient of $10^6$ K/m. In this embodiment, microstructure selection is much less sensitive to thermal gradient than to either interface velocity or composition, so $10^6$ K/m was chosen as an average based on numerical calculations of laser processes in the literature wherein the thermal gradient ranges from approximately $10^4$ to $10^8$ K/m.

Figure 21A:
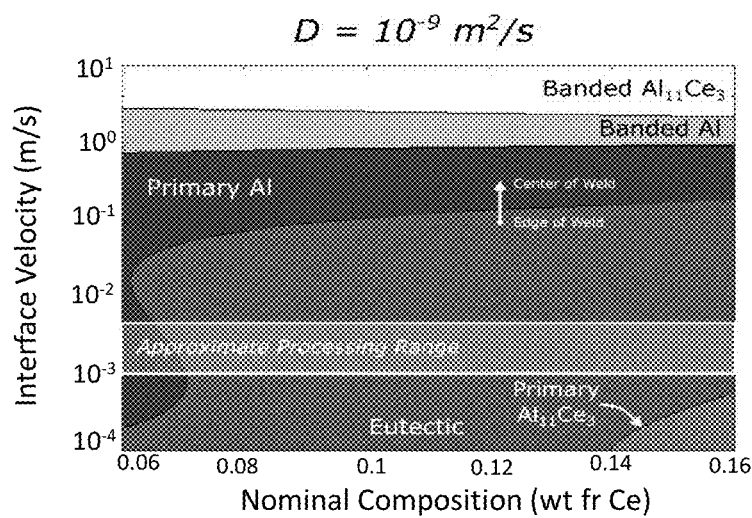
FIGS. 21A and 21B show representative microstructure selection maps in composition vs. velocity space for an assumed thermal gradient of $10^6$ K/m for mass diffusivities of $10^{-9}$ m$^2$/s (FIG. 21A) and (b) $10^{-11}$ m$^2$/s (FIG. 21B); the white arrow shows an approximation of the microstructural path observed within the weld regions.
Figure 21B:
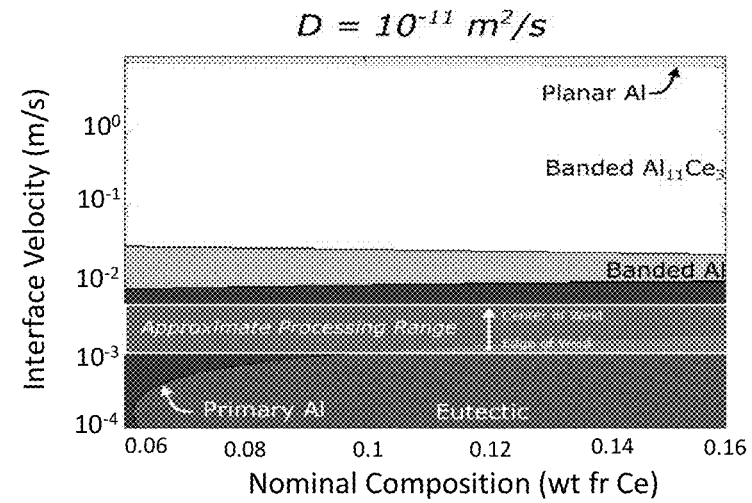

There are several interesting features to note in FIGS. 21A and 21B in relationship to the microstructures discussed above. First, FIG. 21A shows the map for a mass diffusivity in the liquid of $10^{-9}$ m$^2$/s, which, as shown in FIG. 30, gives a reasonable estimation of the eutectic spacing. In one independent embodiment, the model may estimate that eutectic growth should be stable, but the observed microstructures present in the laser melted regions (e.g., see FIG. 23A and 23B) may not exactly match that estimation.

The selection maps show that the eutectic structure in the Al—Ce system is extremely stable at low velocities over a wide range of compositions around the eutectic point of Al-10Ce. At higher velocities, a primary dendritic/cellular Al structure becomes stable, and even for compositions rich in Ce, primary intermetallic particles will not form except at very low velocities. This result is consistent with the observations associated with low interface velocities found in casting in which no primary intermetallic particles were observed for Al-12Ce, but a reasonable volume fraction was found for Al-16Ce samples. Similarly, for Al-12Ce in this study, no primary intermetallic particles were found. Instead, a eutectic region was present at the outer radius of the welds (low interface velocity, high thermal gradients) that evolved into a primary Al structure nearer the center of the weld (high interface velocity, low thermal gradient). This observed trend in microstructure is indicated in maps in FIGS. 21A and 21B by the white arrows.

Figure 6A:
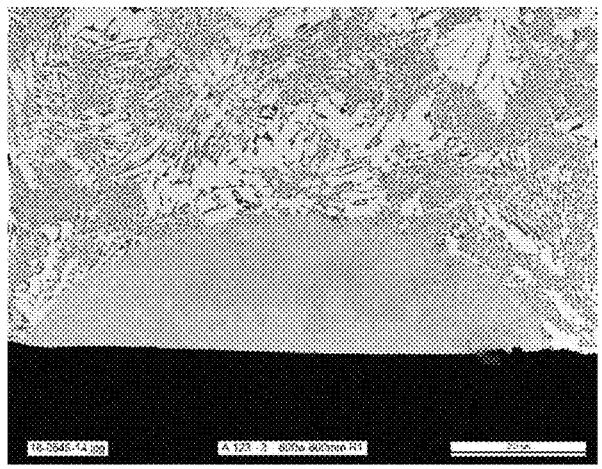
FIGS. 6A-6E include an optical micrograph of an exemplary melt region on a laser-melted Al-8Ce alloy (FIG. 6A), an SEM micrograph showing banded microstructure near the center of the melt region (FIG. 6B), an SEM micrograph of one of the bands near the center of the melt region (wherein the band region is noted by the square in FIG. 6C), an SEM micrograph showing the dendritic structure in the melt region (FIG. 6D), and an SEM micrograph of un-melted intermetallic particles from the as-cast microstructure near the edge of the melt region (FIG. 6E); the melt region was obtained with an 800 W laser at a rate of 800 mm/minute.
Figure 6B:
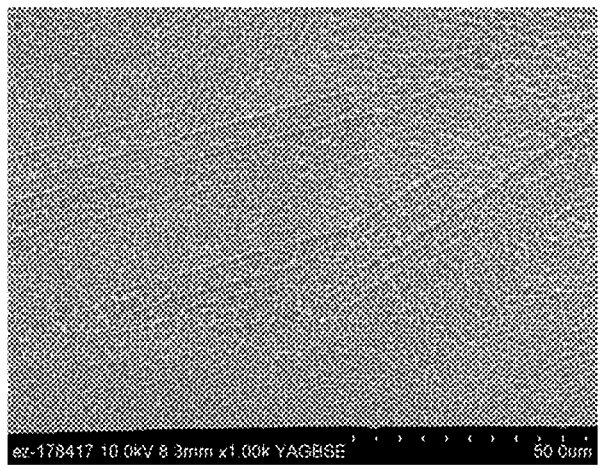
Figure 6C:
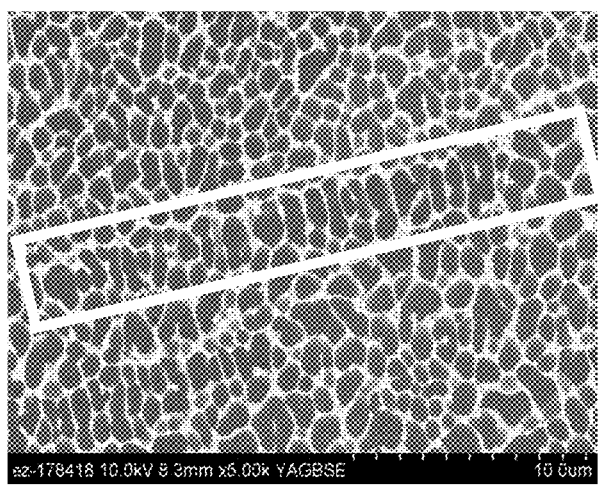
Figure 6D:
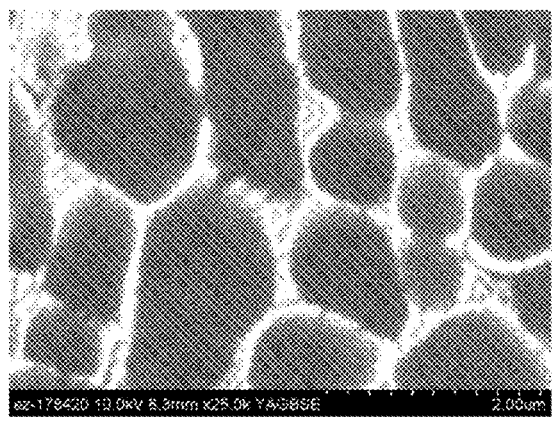
Figure 6E:
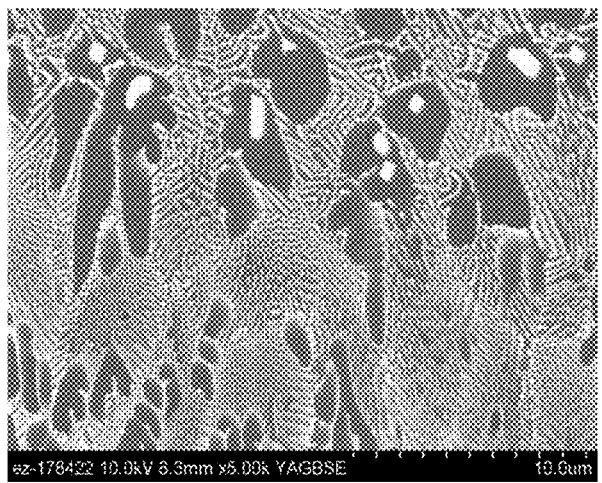
Figure 7:
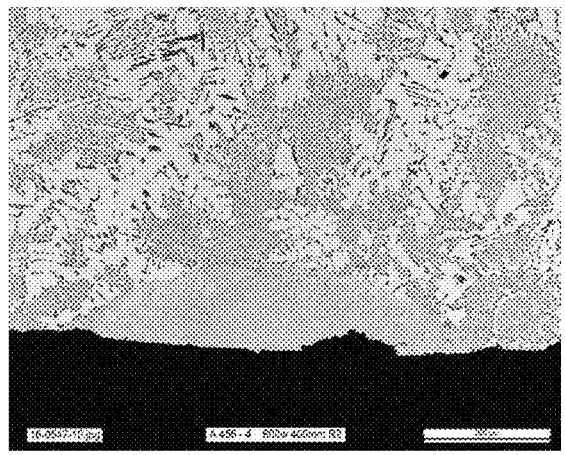
FIG. 7 is an optical micrograph of an exemplary melt region on a laser-melted Al-8Ce alloy obtained with a 600 W laser at a rate of 400 mm/minute.
Figure 8:
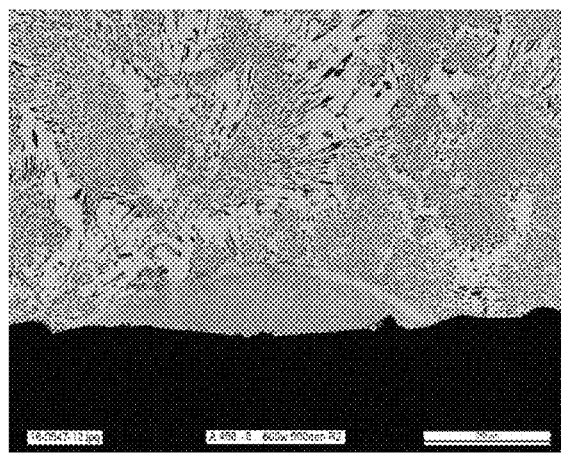
FIG. 8 is an optical micrograph of an exemplary melt region on a laser-melted Al-8Ce alloy obtained with a 600 W laser at a rate of 600 mm/minute.
Figure 9:
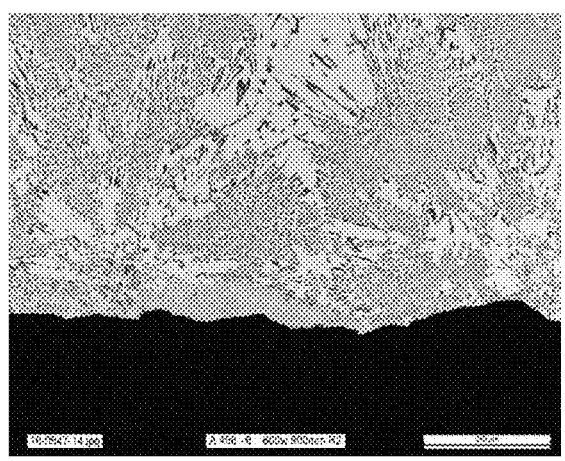
FIG. 9 is an optical micrograph of an exemplary melt region on a laser-melted Al-8Ce alloy obtained with a 600 W laser at a rate of 800 mm/minute.
Figure 10A:
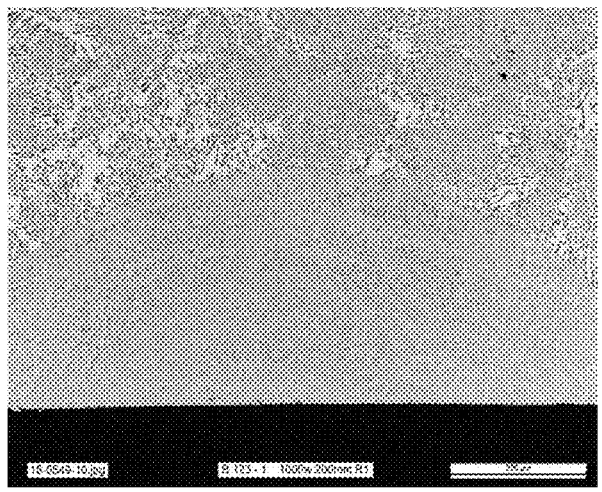
FIGS. 10A-10D are an optical micrograph of an exemplary melt region on a laser-melted Al-12Ce alloy (FIG. 10A), an SEM micrograph at the edge of the laser-melted region showing no heat-affected zone in the bulk portion (FIG. 10B), an SEM micrograph of the edge of the laser-melted region (FIG. 10C), and an SEM micrograph showing fine eutectic structure in the laser-melted region (FIG. 10D); the melt region was obtained with a 1000 W laser at a rate of 200 mm/minute.
Figure 10B:
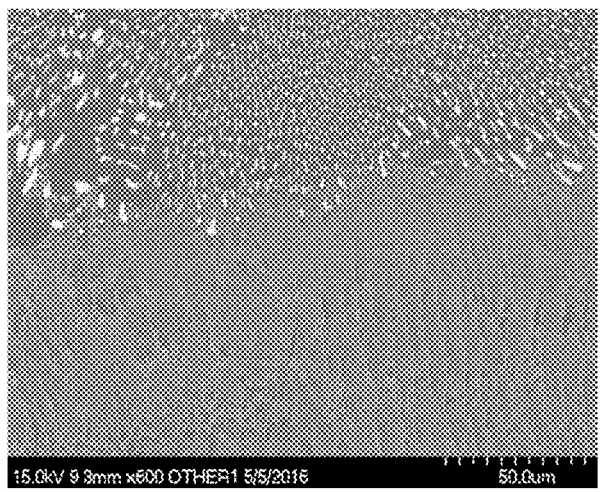
Figure 10C:
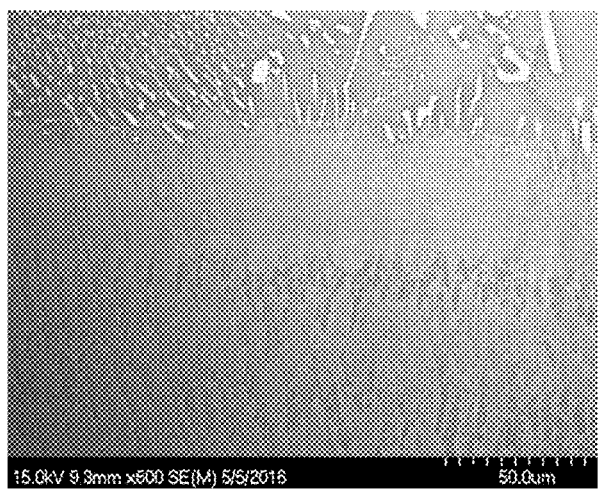
Figure 10D:
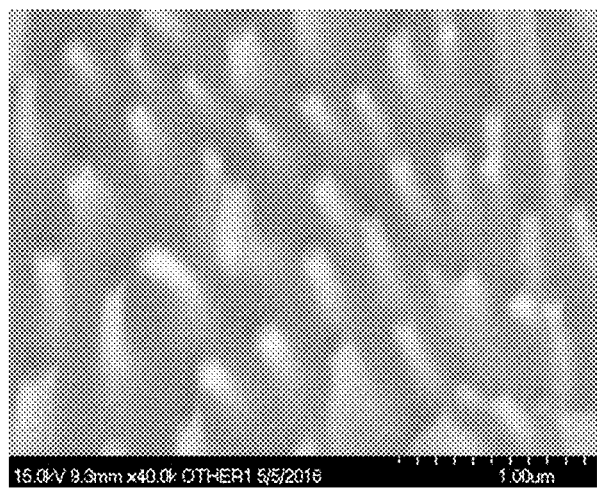
Figure 11:
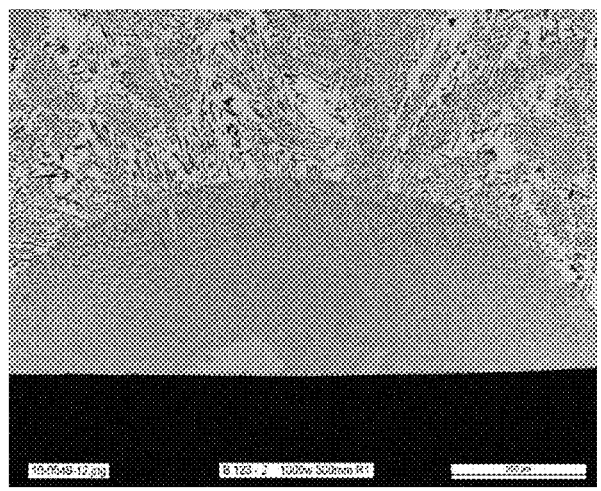
FIG. 11 is an optical micrograph of an exemplary melt region on a laser-melted Al-12Ce alloy obtained with a 1000 W laser at a rate of 500 mm/minute.
Figure 12:
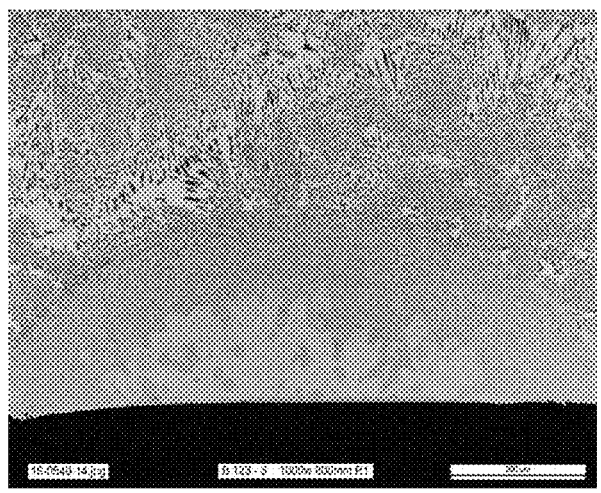
FIG. 12 is an optical micrograph of an exemplary melt region on a laser-melted Al-12Ce alloy obtained with a 1000 W laser at a rate of 800 mm/minute.
Figure 13:
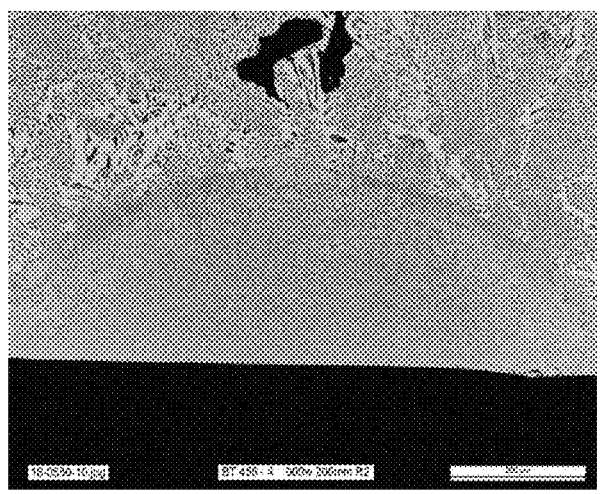
FIG. 13 is an optical micrograph of an exemplary melt region on a laser-melted Al-12Ce alloy obtained with a 900 W laser at a rate of 200 mm/minute.
Figure 14:
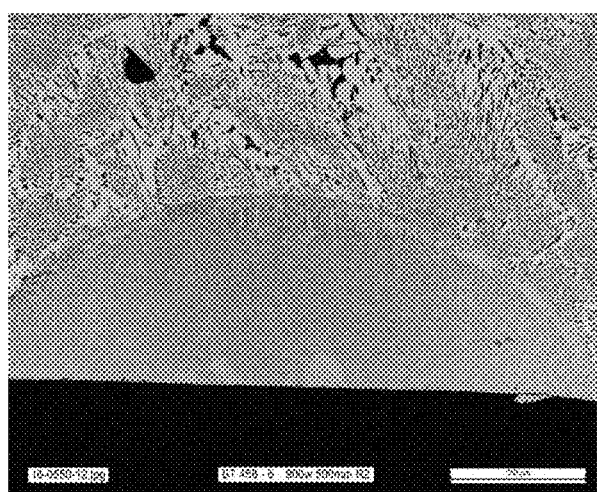
FIG. 14 is an optical micrograph of an exemplary melt region on a laser-melted Al-12Ce alloy obtained with a 900 W laser at a rate of 500 mm/minute.
Figure 15:
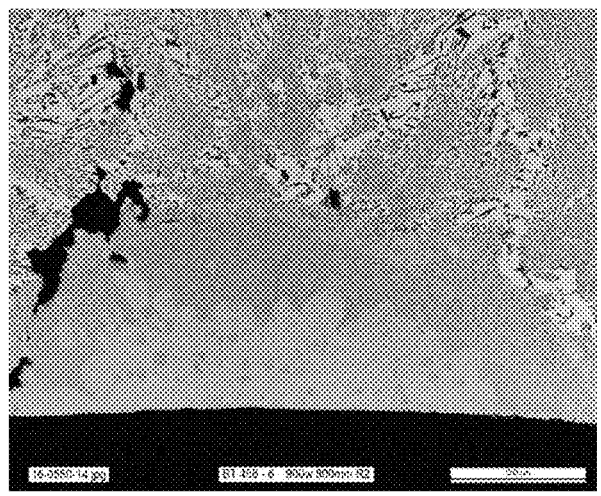
FIG. 15 is an optical micrograph of an exemplary melt region on a laser-melted Al-12Ce alloy obtained with a 900 W laser at a rate of 800 mm/minute.
Figure 16A:
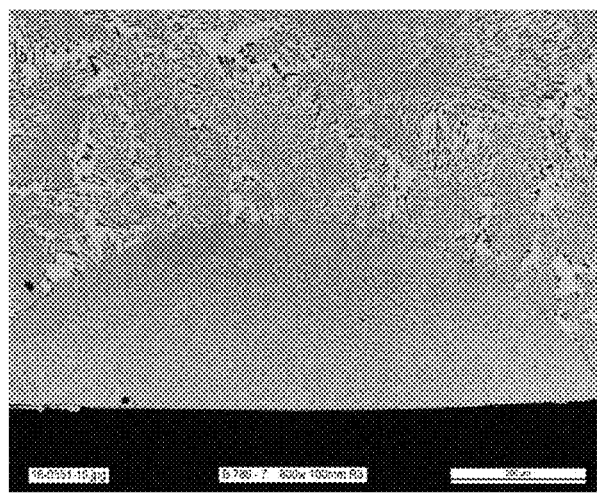
FIGS. 16A-16G include an optical micrograph of an exemplary melt region on a laser-melted Al-12Ce alloy (FIG. 16A), an SEM micrograph showing eutectic growth near the edge of the laser-melted region (FIG. 16B), an SEM micrograph of eutectic colonies in the laser-melted region (FIG. 16C), an SEM micrograph showing the evolution from eutectic to dendritic/cellular growth near the center of the laser-melted region (FIG. 16D), a high-magnification SEM micrograph of aluminum dendrites/cells near the center of the laser-melted region, with Al—$Al_{11}Ce_3$ in the interdendritic/intercellular regions (FIG. 16E), an SEM micrograph of the edge of the laser-melted region after heat treatment at 300° C. for 24 hours (FIG. 16F), and an SEM micrograph of the eutectic microstructure in the laser-melted region after heat treatment at 300° C. for 24 hours showing no signs of microstructural coarsening as compared to FIG. 16A (FIG. 16G); the melt region was obtained with an 800 W laser at a rate of 100 mm/minute.
Figure 16B:
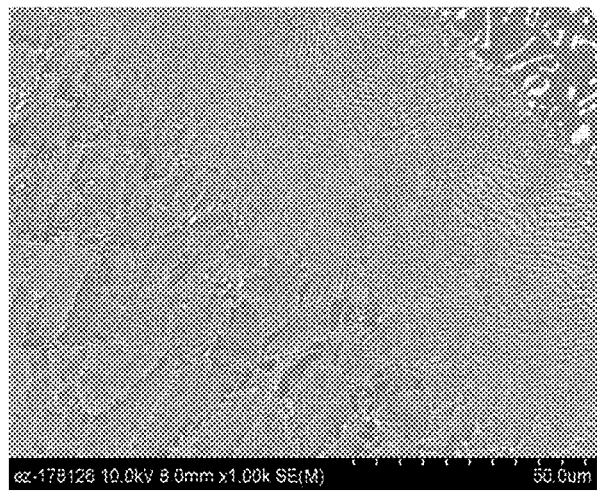
Figure 16C:
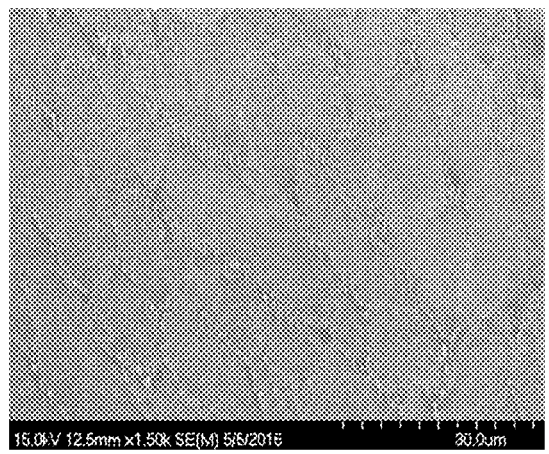
Figure 16D:
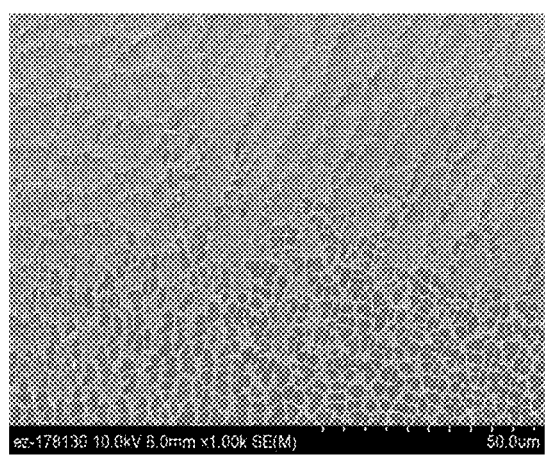
Figure 16E:
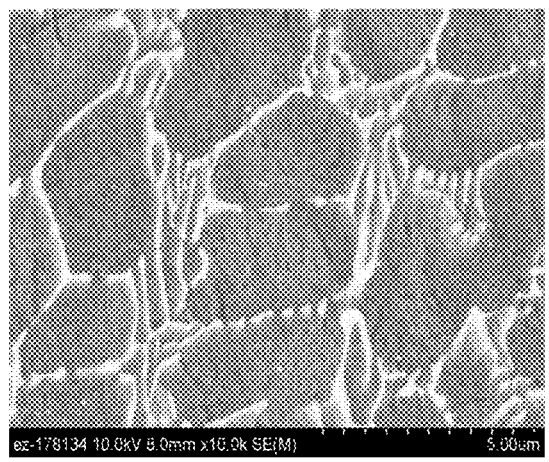
Figure 16F:
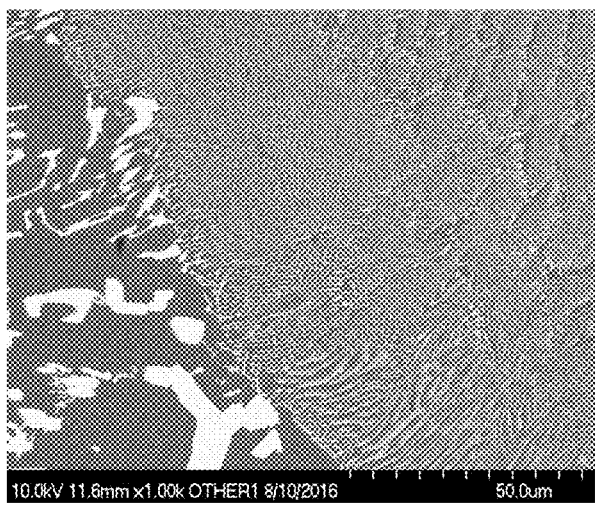
Figure 16G:
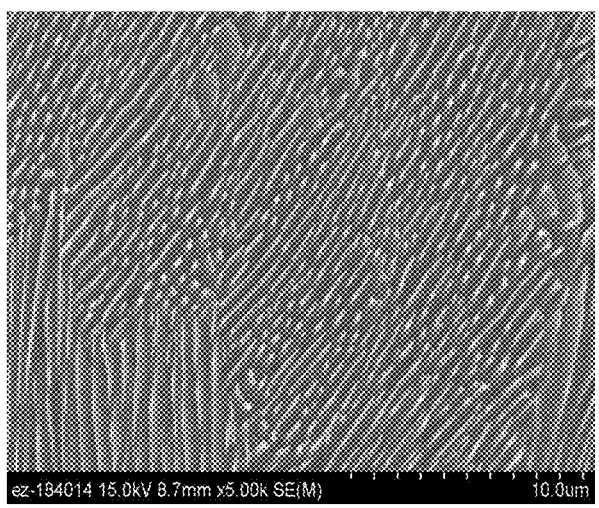
Figure 17A:
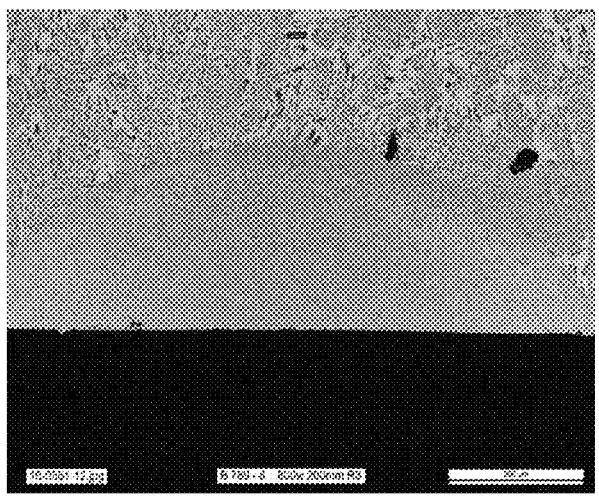
FIGS. 17A-17F include an optical micrograph of an exemplary melt region on a laser-melted Al-12Ce alloy (FIG. 17A), an SEM micrograph showing the differences in microstructure with position within the laser-melted region (FIG. 17B), an SEM micrograph of the eutectic microstructure in the laser-melted region (FIG. 17C), an SEM micrograph of dendritic aluminum in the laser-melted region (FIG. 17D), and SEM micrographs of the eutectic microstructure near the edge of the laser-melted region after heat treatment at 300° C. for 24 hours, showing no signs of microstructural coarsening (FIG. 17E and FIG. 17F); the melt region was obtained with an 800 W laser at a rate of 200 mm/minute.
Figure 17B:
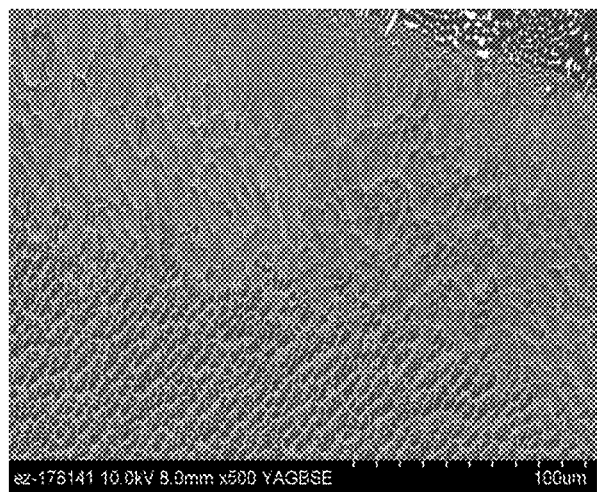
Figure 17C:
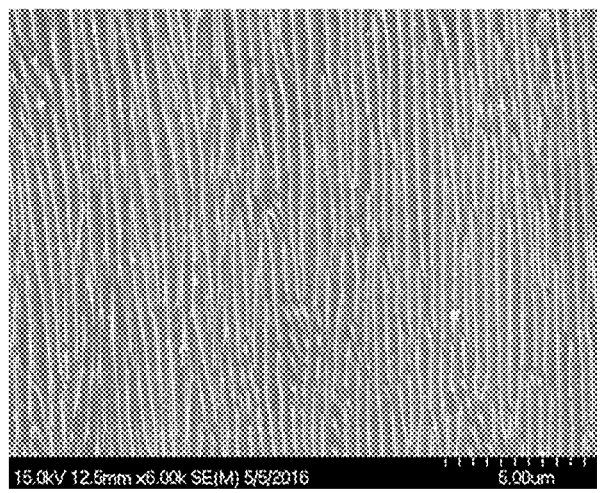
Figure 17D:
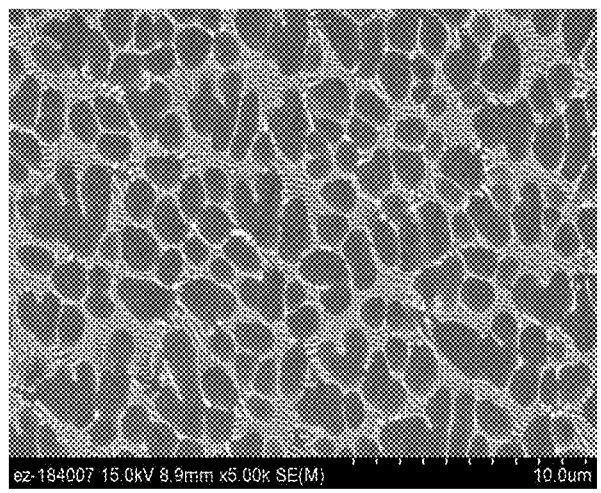
Figure 17E:
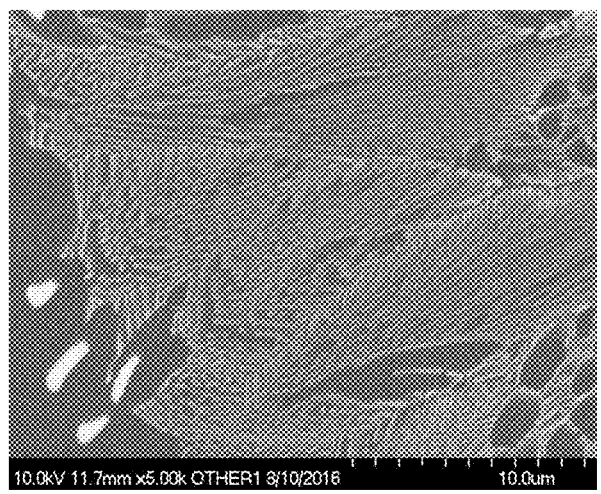
Figure 17F:
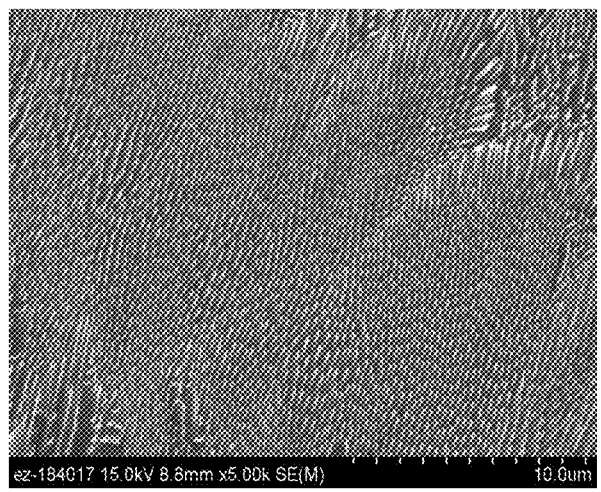
Figure 18A:
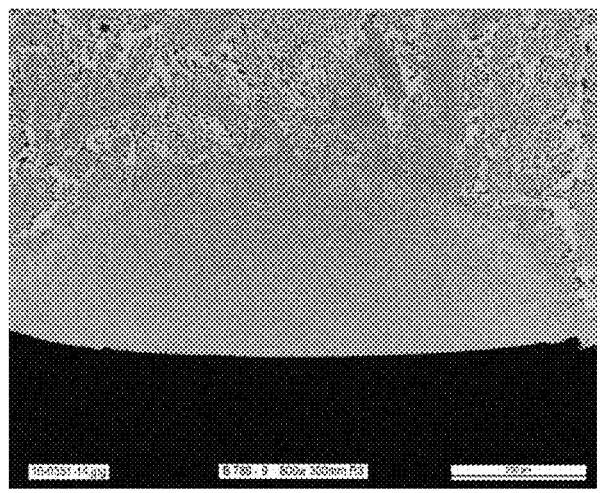
FIGS. 18A-18F include an optical micrograph of an exemplary melt region on a laser-melted Al-12Ce alloy (FIG. 18A), an SEM micrograph showing the differences in microstructure with position within the laser-melted region (FIG. 18B), an SEM micrograph of aluminum dendrites/cells with interdendritic/intercellular eutectic in the laser-melted region (FIG. 18C), an SEM micrograph near the edge of the laser-melted region showing differences in microstructure with position (FIG. 18D), an SEM micrographs of the eutectic microstructure near the edge of the laser-melted region after heat treatment at 300° C. for 24 hours, showing no signs of microstructural coarsening (FIG. 18E), and a high-magnification SEM micrograph of the ultra-fine eutectic structure in the laser-melted region after heat treatment at 300° C. for 24 hours (FIG. 18F), showing no signs of microstructural coarsening; the melt region was obtained with an 800 W laser at a rate of 300 mm/minute.
Figure 18B:
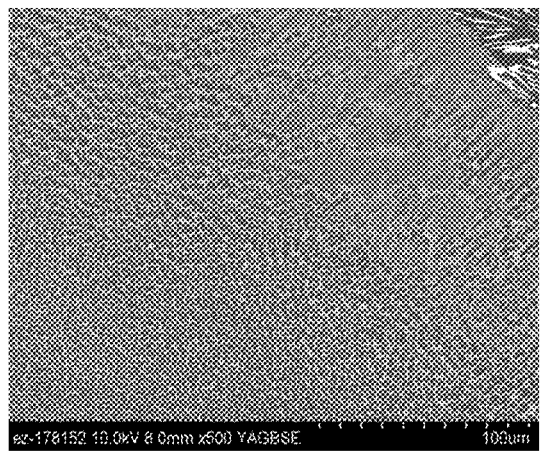
Figure 18C:
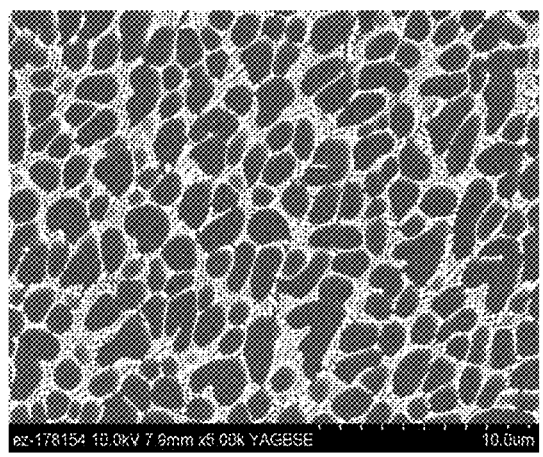
Figure 18D:
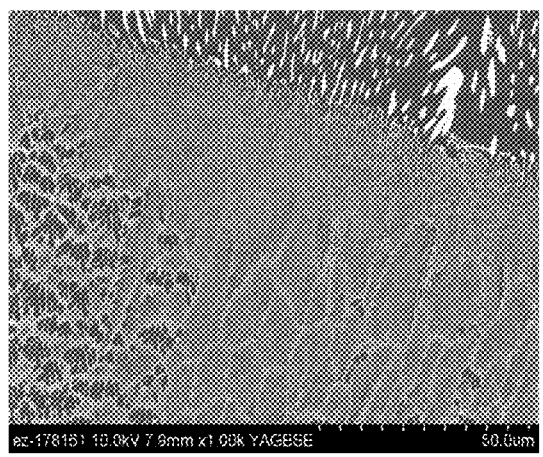
Figure 18E:
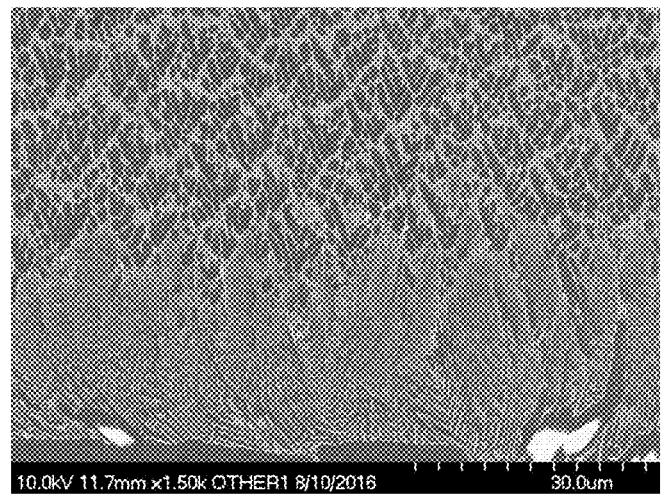
Figure 18F:
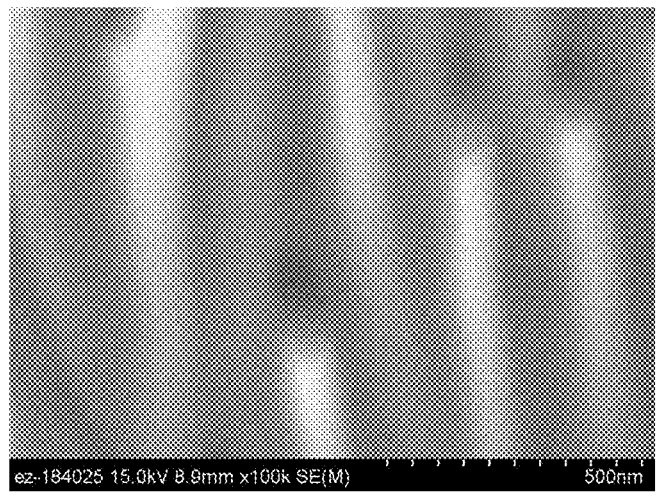
Figure 31:
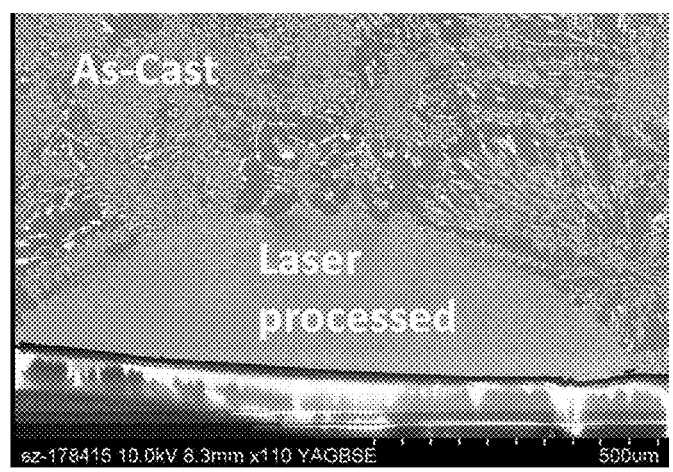
FIG. 31 is an SEM micrograph showing the difference in microstructure length scale between an as-cast and laser-melted Al-8Ce alloy embodiment.
Figures 32A, 32B:
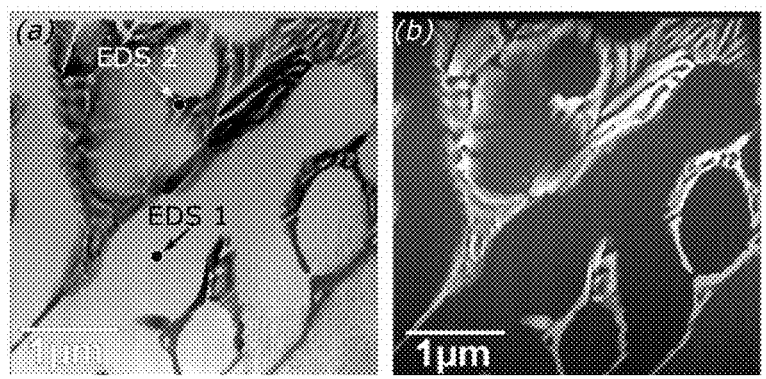
FIGS. 32A-32G are BF-STEM (FIG. 32A) and HAADF-STEM (FIG. 32B) images of an Al-8Ce alloy processed at 800 W with a beam velocity of 800 mm/min with EDS elemental maps for Al (FIG. 32C) and Ce (FIG. 32D) and EDS point spectra from Al-rich region (EDS 1) (FIG. 32E), Ce-rich region (EDS 2) (FIG. 32F), and EDS line profile generated across Ce-rich region given in wt. % Ce (FIG. 32G).
Figures 32C, 32D:
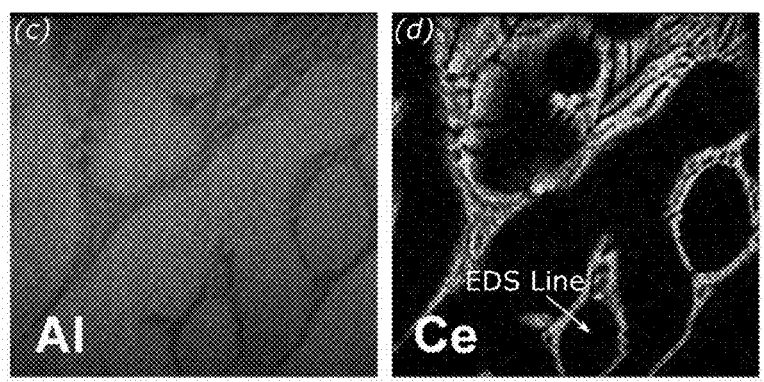
Figure 32E:
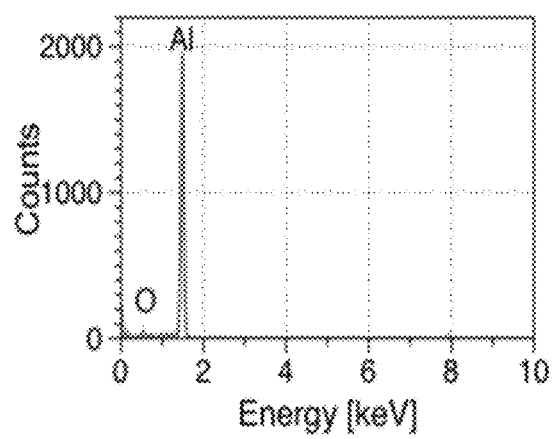
Figure 32F:
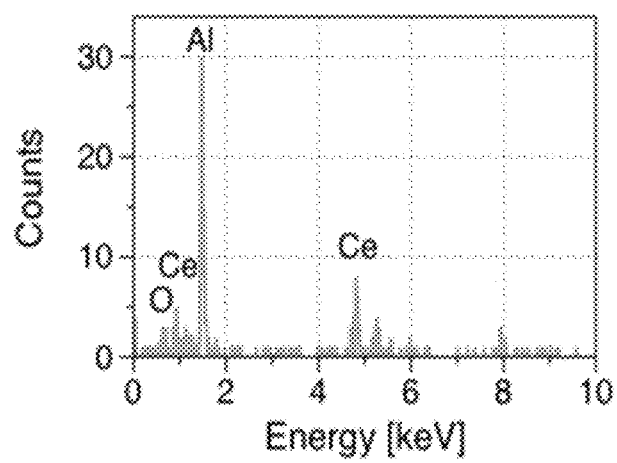
Figure 32G:
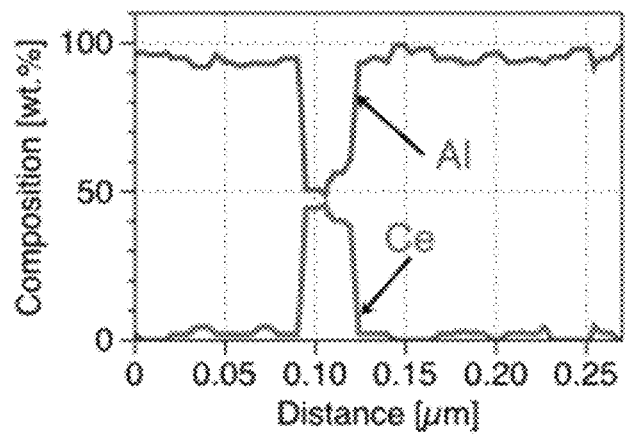

One additional laser melt was produced for an Al-8Ce cast plate with a beam velocity of 800 mm/min and power of 800 W. A micrograph showing the difference between the as-cast and the laser processed Al-8Ce is shown in FIG. 31. Micrographs of the resulting microstructure near the center of the weld region (where the interface growth velocity is highest) are shown in FIGS. 6B and 6C. Again, the majority of the microstructure comprises primary Al dendrites/cells, but some banding is also apparent. The banding observed here, however, is quite different from high velocity banding reported in the literature. Normally, the banded structure alternates between dendritic and planar growth due to oscillations in the interface growth velocity, with complete solute entrapment in the latter structure occurring when the velocity is fastest. In this example, however, the bands are cellular/dendritic, but highly aligned compared to the surrounding microstructure. In addition, banding in this material appears to occur at significantly lower velocities than other Al alloys (about 0.01 m/s here compared to about 0.5-0.75 m/s in Al—Fe, or 0.5 m/s in Al—Cu). Similar to traditionally observed banding, the oscillating microstructure here is highly periodic.

Figure 33:
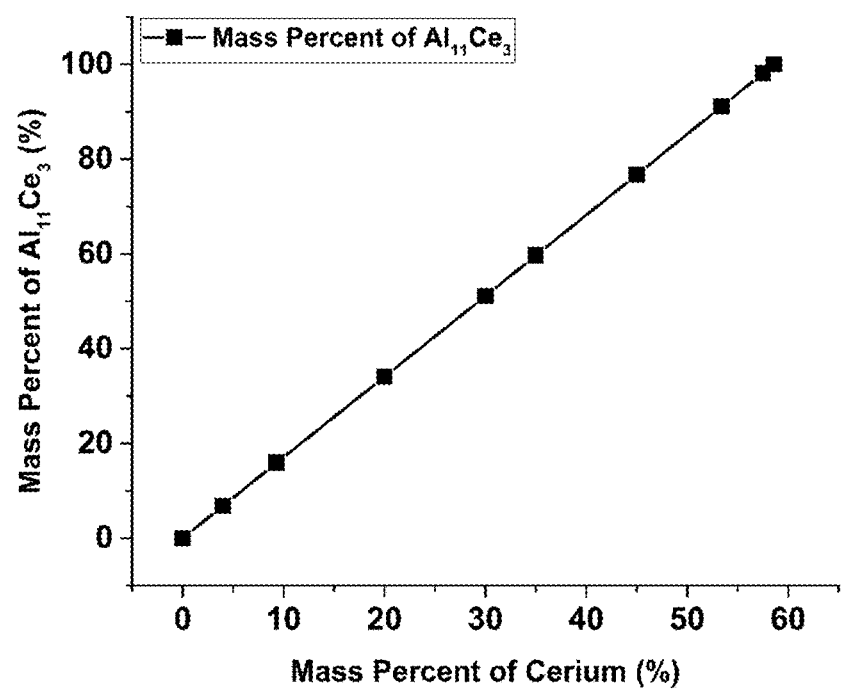
FIG. 33 is a plot of mass percent of $Al_{11}Ce_3$ vs. the compositional mass percent of elemental cerium added to aluminum alloy.
Figure 34:
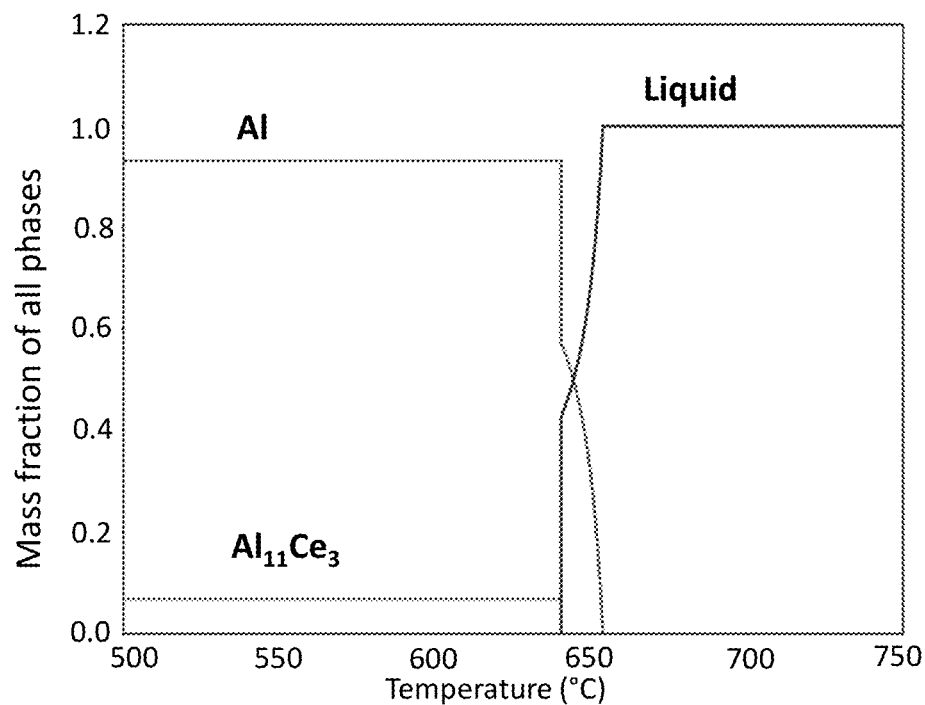
FIG. 34 is an Al-4Ce property diagram showing primary aluminum solidification followed by a eutectic reaction forming a two phase Al and $Al_{11}Ce_3$ alloy.
Figure 35:
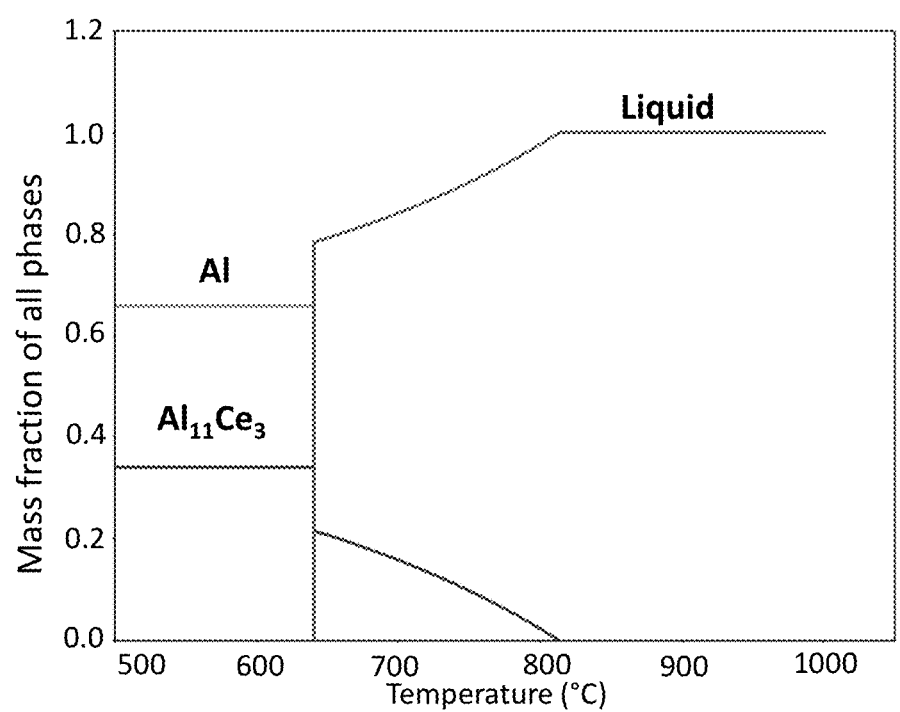
FIG. 35 is an Al-20Ce property diagram showing primary $Al_{11}Ce_3$ solidification followed by a eutectic reaction forming a two phase Al and $Al_{11}Ce_3$ alloy.
Figure 36:
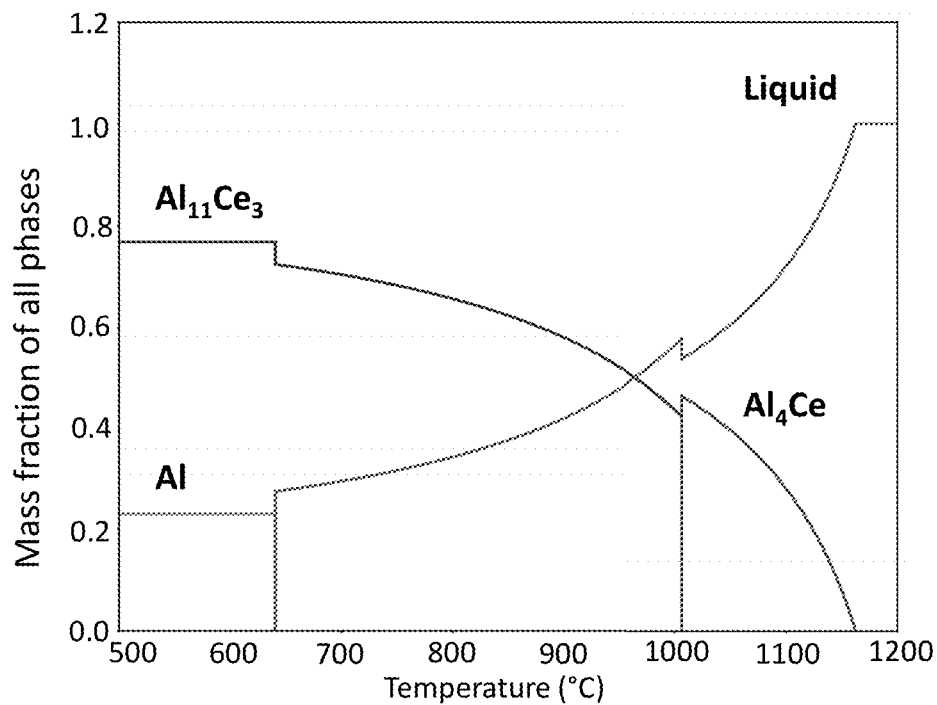
FIG. 36 is an Al-45Ce property diagram showing primary solidification of $Al_4Ce$, which phase transforms into $Al_{11}Ce_3$ and continues primary solidification ending in a eutectic reaction leaving $Al_{11}Ce_3$ and Al binary alloy.
Figure 37:
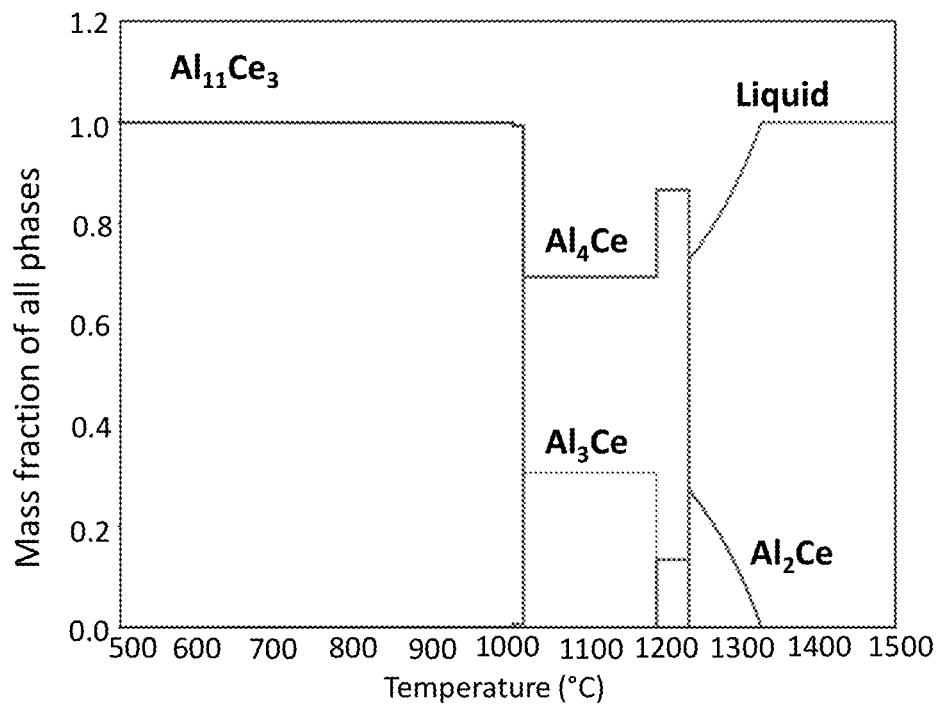
FIG. 37 is an Al-60Ce property diagram showing the complex solidification process ending precipitation of pure $Al_{11}Ce_3$ phase.

Considering the non-equilibrium nature of the banded microstructure, TEM energy dispersive spectroscopy (EDS) was performed to identify if any significant solute trapping of Ce within the Al matrix occurred during solidification (FIGS. 32A-32G). The line scan EDS results in FIG. 33G show the Ce content in the Al matrix ranging between approximately 0 and 2 wt %. Although 2 wt % Ce in the Al matrix is high compared to the equilibrium partition coefficient (on the order of $10^{-11}$), this is within the expected experimental error of this technique. From these results, it may be concluded that planar solidification and solute trapping was not achieved during the banded solidification, in which case the Ce content would have approached the nominal alloy composition of 8 wt %. Other phases of alloys and intermetallic structures described herein are illustrated in FIGS. 34-37 and FIG. 33 shows that as the mass percent of cerium is increased, the mass percent of the $Al_{11}Ce_3$ intermetallic increases.

Figure 38:
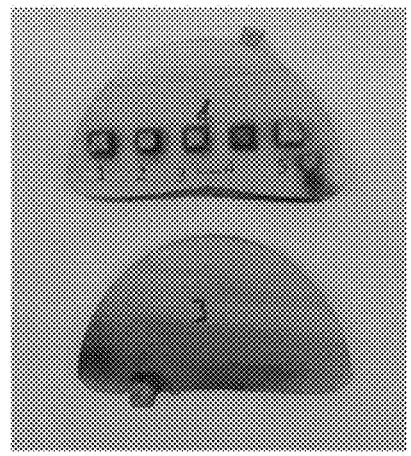
FIG. 38 is an image of a sample formed using Laser Engineered Nest Shaping (LENS) method from Al—Ce—Mg powders, wherein areas "1-6" represent vertical pillars printed using various laser powers and speed.
Figure 39A:
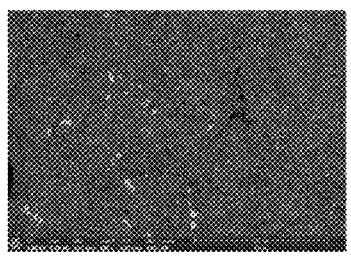
Figure 39B:
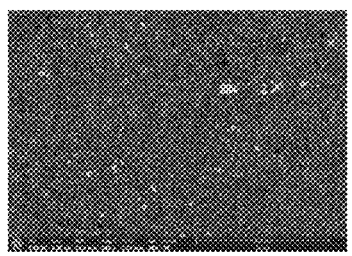
Figure 39C:
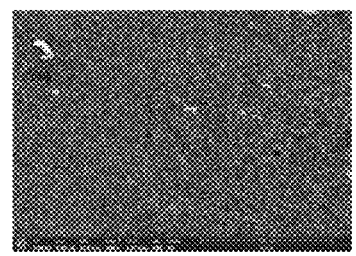
Figure 39D:
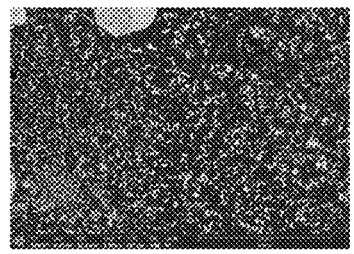
Figure 39E:
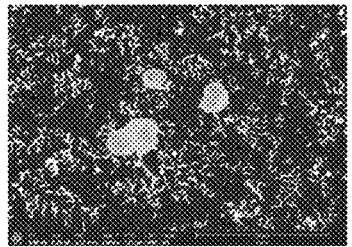
Figure 39F:
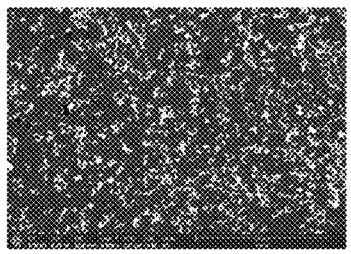
Figure 39G:
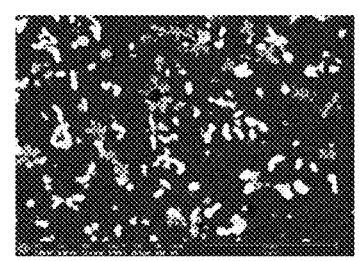
Figure 39H:
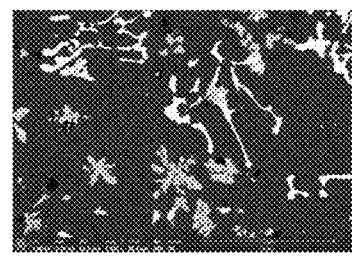
Figure 39I:
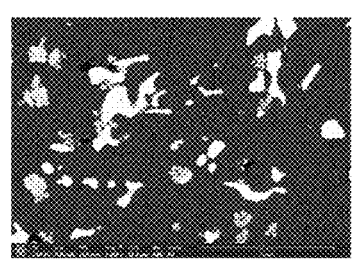
Figure 40A:
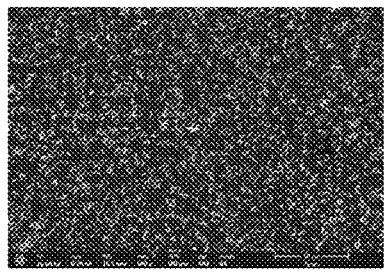
FIGS. 40A-40F are images showing comparisons before and after annealing at 300° C. for 72 hrs of microstructures of an alloy pillar product made using additive manufacturing, wherein the imaged microstructures are located in the bottom portion of the alloy pillar product.
Figure 40B:
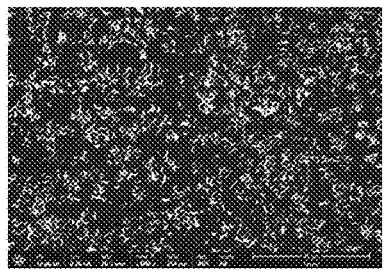
Figure 40C:
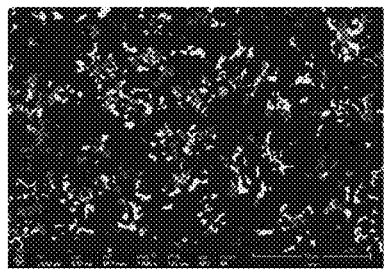
Figure 40D:
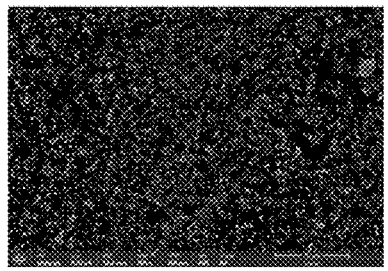
Figure 40E:
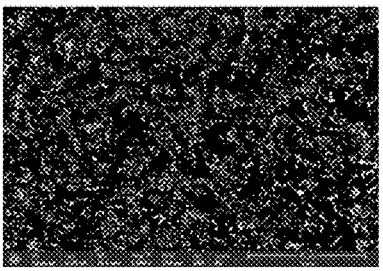
Figure 40F:
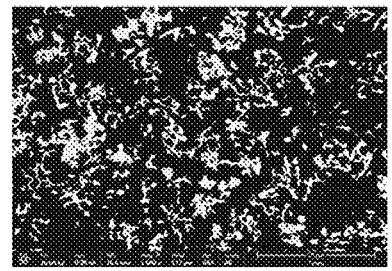
Figure 41A:
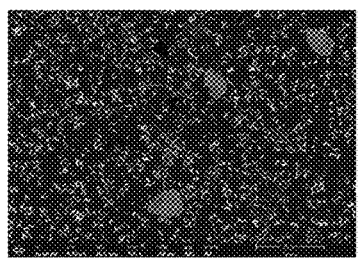
FIGS. 41A-41F are images showing comparisons before and after annealing at 300° C. for 72 hrs of microstructures of an alloy pillar product made using additive manufacturing, wherein the imaged microstructures are located in the middle portion of the alloy pillar product.
Figure 41B:
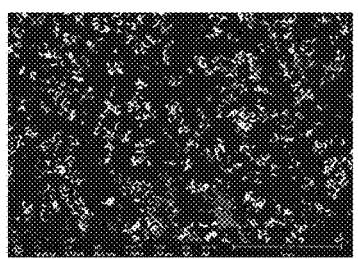
Figure 41C:
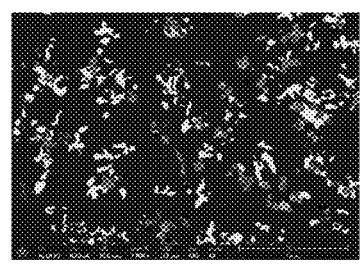
Figure 41D:
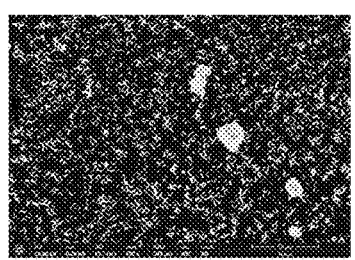
Figure 41E:
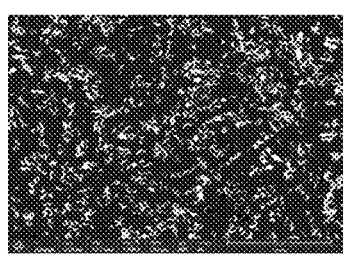
Figure 41F:
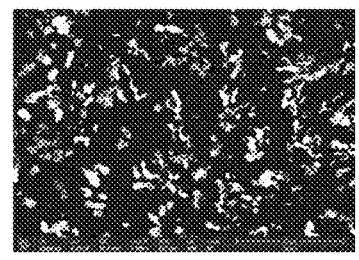
Figure 42A:
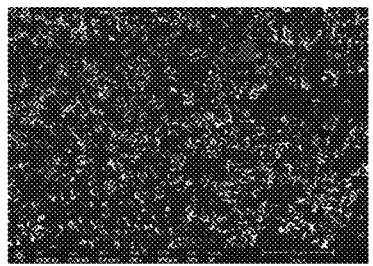
FIGS. 42A-42F are images showing comparisons before and after annealing at 300° C. for 72 hrs of microstructures of an alloy pillar product made using additive manufacturing, wherein the imaged microstructures are located in the top portion of the alloy pillar product.
Figure 42B:
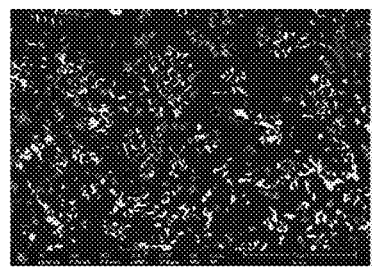
Figure 42C:
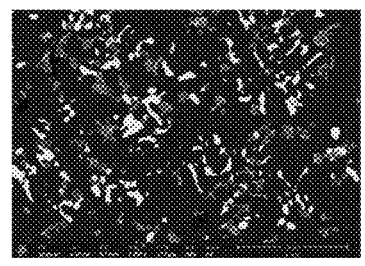
Figure 42D:
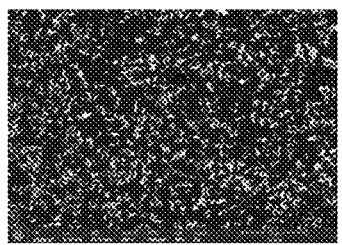
Figure 42E:
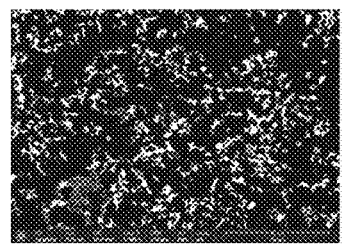
Figure 42F:

Representative embodiments were no substantial coarsening was observed are illustrated in FIGS. 39A-38I, 40A-40F, 41A-41F, and 42A-42F. In these embodiments, the microstructure of a printed product (such as product cross-sections illustrated in FIG. 38) was free of substantial coarsening throughout a print axis of the product. FIGS. 39A-I are low-high magnification images of an Al-8Ce-10Mg alloy embodiment, wherein the images show that three different regions (lower region, middle region, and top region) of a portion of the pillar shown in FIG. 38 do not exhibit substantial coarsening and thus exhibit a uniform microstructure throughout a print axis of the product. FIGS. 40A-40F, 41A-41F, and 42A-42F confirm that the product is able to resist substantial coarsening even after being annealing at 300° C. for 72 hours.

In view of the many possible embodiments to which the principles of the present disclosure may be applied, it should be recognized that the illustrated embodiments are only preferred examples and should not be taken as limiting the scope of the disclosure. Rather, the scope is defined by the following claims. We therefore claim as our invention all that comes within the scope and spirit of these claims.

We claim:

1. An alloy product, comprising one or more shaped alloy layers formed about a print axis, wherein the one or more shaped alloy layers includes an alloy comprising:
   4 wt % to 60 wt % Y, La, Ce, Pr, Nd, Sm, Eu, Gd, Tb, Dy, Ho, Er, Tm, Yb, or any combination thereof;
   5 wt % to 15 wt % Mg;
   0 wt % to 12 wt % Si;
   0 wt % to 6 wt % Fe;
   0 wt % to 5 wt % Ni;
   0 wt % to 6 wt % Zn; and
   a balance of aluminum; and
   wherein Vickers hardness of the alloy product changes by less than 20% when exposed to a 400° C. environment for 24 hours, wherein the Vickers hardness is measured by ASTM method E384.

2. The alloy product of claim 1, wherein the alloy comprises 4 wt % to 20 wt % Ce, La, or any combination thereof.

3. The alloy product of claim 1, wherein the alloy comprises 8 wt % to 16 wt % Ce, La, or any combination thereof.

4. The alloy product of claim 1, wherein the alloy product has at least substantially uniform bulk mechanical properties.

5. The alloy product of claim 1, wherein the alloy product comprises a eutectic microstructural constituent that does not exhibit substantial coarsening such that an increase in average spacing of lamellae and/or particles within a microstructure of the shaped alloy layers does not occur after being exposed to a post-additive manufacturing process utilizing processing temperatures of 150° C. to 500° C. for 1500 hours.

6. The alloy product of claim 1, wherein 40% to 100% by volume of the alloy product comprises a eutectic structure, a semi-eutectic structure, or a combination thereof.

7. An alloy product, comprising one or more shaped alloy layers formed about a print axis, wherein the one or more shaped alloy layers includes an alloy comprising:
   4 wt % to 60 wt % Y, La, Ce, Pr, Nd, Sm, Eu, Gd, Tb, Dy, Ho, Er, Tm, Yb, or any combination thereof;
   5 wt % to 15 wt % Mg;
   0 wt % to 12 wt % Si;
   0 wt % to 6 wt % Fe;
   0 wt % to 5 wt % Ni;
   0 wt % to 6 wt % Zn; and
   a balance of aluminum; and
   wherein the alloy product further comprises one or more additional shaped alloy layers made of an alloy that does not comprise aluminum and/or a rare earth component selected from Sc, Y, La, Ce, Pr, Nd, Sm, Eu, Gd, Tb, Dy, Ho, Er, Tm, Yb, or any combination thereof.

8. The alloy product of claim 1, wherein the one or more shaped alloy layers do not exhibit substantial coarsening such that an increase in average spacing of lamellae and/or particles within a microstructure of the shaped alloy layers does not occur over 24 hours at 300° C.

9. An alloy product, comprising one or more shaped alloy layers formed about a print axis, wherein the one or more shaped alloy layers includes an alloy comprising:
   4 wt% to 60 wt % Sc, Y, La, Ce, Pr, Nd, Sm, Eu, Gd, Tb, Dy, Ho, Er, Tm, Yb, or any combination thereof;
   2 wt % to 15 wt % Mg;
   0 wt % to 12 wt % Si;
   0 wt % to 6 wt % Fe;
   0 wt % to 5 wt % Ni;
   0 wt % to 6 wt % Zn; and
   a balance of aluminum;
   wherein the alloy product has a Vickers hardness that changes by less than 20% when the alloy product is exposed to a 400° C. environment for 24 hours, wherein the Vickers hardness is measured by ASTM method E384.

10. The alloy product of claim 1, wherein the alloy product comprises a microstructure containing an $Al_{11}X_3$ intermetallic particle having a particle size ranging from 250 nm to 2 microns.

11. The alloy product of claim 7, wherein the alloy comprises 4 wt % to 20 wt % Ce, La, or any combination thereof.

12. The alloy product of claim 7, wherein the alloy comprises 8 wt % to 16 wt % Ce, La, or any combination thereof.

13. The alloy product of claim 9, wherein the alloy comprises 4 wt % to 20 wt % Ce, La, or any combination thereof.

14. The alloy product of claim 9, wherein the alloy comprises 8 wt % to 16 wt % Ce, La, or any combination thereof.

15. The alloy product of claim 9, wherein the alloy product has at least substantially uniform bulk mechanical properties.

16. The alloy product of claim 9, wherein the alloy product comprises a eutectic microstructural constituent that does not exhibit substantial coarsening such that an increase in average spacing of lamellae and/or particles within a microstructure of the shaped alloy layers does not occur after being exposed to a post-additive manufacturing process utilizing processing temperatures of 150° C. to 500° C. for 1500 hours.

17. The alloy product of claim 9, wherein 40% to 100% by volume of the alloy product comprises a eutectic structure, a semi-eutectic structure, or a combination thereof.

* * * * *